US009308827B2

(12) United States Patent
Kobayashi et al.

(10) Patent No.: US 9,308,827 B2
(45) Date of Patent: Apr. 12, 2016

(54) REACHABLE RANGE CALCULATION APPARATUS, METHOD, AND PROGRAM

(71) Applicant: Hitachi, Ltd., Tokyo (JP)

(72) Inventors: Yuichi Kobayashi, Tokyo (JP); Keisuke Shirai, Tokyo (JP); Masamori Kashiyama, Tokyo (JP); Tatsuaki Osafune, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 29 days.

(21) Appl. No.: 14/363,717

(22) PCT Filed: Dec. 5, 2012

(86) PCT No.: PCT/JP2012/081495
§ 371 (c)(1),
(2) Date: Jun. 6, 2014

(87) PCT Pub. No.: WO2013/084931
PCT Pub. Date: Jun. 13, 2013

(65) Prior Publication Data
US 2014/0303826 A1  Oct. 9, 2014

(30) Foreign Application Priority Data

Dec. 8, 2011 (JP) .................... 2011-269230

(51) Int. Cl.
*B60L 11/18* (2006.01)
*G01C 21/34* (2006.01)

(52) U.S. Cl.
CPC ......... *B60L 11/1861* (2013.01); *B60L 11/1862* (2013.01); *G01C 21/3469* (2013.01);
(Continued)

(58) Field of Classification Search
CPC ............ B60L 11/1862; B60L 11/1861; B60L 2240/12; B60L 2240/622; B60L 2240/72; B60L 2250/16; B60L 2260/52; B60L 2260/54; B60L 2200/12; G01C 21/3469; Y02T 10/7258; Y02T 90/161; Y02T 10/7044; Y02T 10/7005; Y02T 10/705; Y02T 90/16; Y02T 90/162; Y02T 90/163; Y02T 10/7291
USPC ........................................... 701/22
See application file for complete search history.

(56) References Cited

U.S. PATENT DOCUMENTS

| 8,417,401 B2 | 4/2013 | Takahara et al. | |
| 2009/0210357 A1* | 8/2009 | Pudar ................. | B60L 11/1816 705/412 |

(Continued)

FOREIGN PATENT DOCUMENTS

| JP | 2006-115623 A | 4/2006 |
| JP | 2009-025128 A | 2/2009 |
| JP | 2010-125868 A | 6/2010 |
| JP | 2011-053066 A | 3/2011 |
| JP | 2011-217509 A | 10/2011 |

OTHER PUBLICATIONS

PCT International Search Report on application PCT/JP2012/081495 mailed Mar. 12, 2013; 3 pages.

*Primary Examiner* — Russell Frejd
(74) *Attorney, Agent, or Firm* — Foley & Lardner LLP

(57) ABSTRACT

A reachable range calculation apparatus for computing a range that a vehicle traveling on stored energy is able to reach, comprising: a storage part for storing beforehand information on a required amount of energy consumed when the vehicle moves, using each of a plurality of areas into which a map has been divided as a unit; an integration part for integrating, with respect to movement of the vehicle from a specified origin to a surrounding area, a required amount of energy on the basis of the required amount of energy stored in the storage part, each time the vehicle moves between areas; and a range determination part for determining, on the basis of a provided specified amount of energy and an integrated required amount of energy obtained by the integration part integrating energy-consumption amounts, a reachable range, which is a range of areas that the vehicle is able to reach using the specified amount of energy.

19 Claims, 11 Drawing Sheets

(52) U.S. Cl.
CPC .......... *B60L2200/12* (2013.01); *B60L 2240/12* (2013.01); *B60L 2240/622* (2013.01); *B60L 2240/72* (2013.01); *B60L 2250/16* (2013.01); *B60L 2260/52* (2013.01); *B60L 2260/54* (2013.01); *Y02T 10/705* (2013.01); *Y02T 10/7005* (2013.01); *Y02T 10/7044* (2013.01); *Y02T 10/7258* (2013.01); *Y02T 10/7291* (2013.01); *Y02T 90/16* (2013.01); *Y02T 90/161* (2013.01); *Y02T 90/162* (2013.01); *Y02T 90/163* (2013.01)

(56) References Cited

U.S. PATENT DOCUMENTS

| | | | |
|---|---|---|---|
| 2010/0094496 A1* | 4/2010 | Hershkovitz | B60L 3/12 701/22 |
| 2010/0131139 A1 | 5/2010 | Sakai et al. | |
| 2011/0166774 A1* | 7/2011 | Schunder | G01C 21/3469 701/533 |
| 2011/0208378 A1* | 8/2011 | Krueger | B60W 10/06 701/22 |

* cited by examiner

Fig. 3

| ID | Layer | Cell (o) | Cell (d) | Cost | Vehicle type | Time period |
|---|---|---|---|---|---|---|
| 1888 | 2 | 0473 | 0463 | 200 | C | Weekday afternoon |
| 1889 | 2 | 0473 | 0472 | 240 | C | Weekday afternoon |
| 1890 | 2 | 0473 | 0474 | 240 | C | Weekday afternoon |
| 1891 | 2 | 0473 | 0483 | 200 | C | Weekday afternoon |
| 1892 | 2 | 0474 | 0464 | 240 | C | Weekday afternoon |
| 1893 | 2 | 0474 | 0473 | 300 | C | Weekday afternoon |
| ... | ... | ... | ... | ... | ... | ... |

Fig. 6

| ID | Layer | Cell | Road point (o) | Road point (d) | Cost | Vehicle type | Time period | Road type |
|---|---|---|---|---|---|---|---|---|
| 34113 | 2 | 1234 | 9801 | 9804 | 300 | C | Weekday afternoon | Main road |
| 34114 | 2 | 1234 | 9801 | 9807 | 200 | C | Weekday afternoon | Ordinary road |
| 34115 | 2 | 1234 | 9802 | 9803 | 160 | C | Weekday afternoon | Ordinary road |
| 34116 | 2 | 1234 | 9803 | 9802 | 160 | C | Weekday afternoon | Ordinary road |
| 34117 | 2 | 1234 | 9804 | 9801 | 240 | C | Weekday afternoon | Main road |
| 34118 | 2 | 1234 | 9804 | 9807 | 200 | C | Weekday afternoon | Ordinary road |
| 34119 | 2 | 1234 | 9805 | 9806 | 100 | C | Weekday afternoon | Ordinary road |
| 34120 | 2 | 1234 | 9806 | 9805 | 160 | C | Weekday afternoon | Ordinary road |
| ... | ... | ... | ... | ... | ... | ... | ... | ... |

Fig. 7

| ID | Layer | Cell | Group point (o) | Group point (d) | Cost | Vehicle type | Time period |
|---|---|---|---|---|---|---|---|
| 5678 | 2 | 1234 | 12341 | 12241 | 300 | C | Weekday afternoon |
| 5679 | 2 | 1234 | 12341 | 12332 | 200 | C | Weekday afternoon |
| 5680 | 2 | 1234 | 12342 | 12342 | 160 | C | Weekday afternoon |
| 5681 | 2 | 1234 | 12241 | 12341 | 240 | C | Weekday afternoon |
| 5682 | 2 | 1234 | 12241 | 12332 | 150 | C | Weekday afternoon |
| 5683 | 2 | 1234 | 12332 | 12241 | 200 | C | Weekday afternoon |
| ... | ... | ... | ... | ... | ... | ... | ... |

REACHABLE RANGE CALCULATION APPARATUS, METHOD, AND PROGRAM

CROSS-REFERENCE TO PRIOR APPLICATION

This application relates to and claims the benefit of priority from Japanese Patent Application No. 2011-269230 filed on Dec. 8, 2011, the entire disclosure of which is incorporated herein by reference.

TECHNICAL FIELD

The disclosed subject relates to technology for computing the range that an electrically driven vehicle traveling on electrical energy stored in a battery is able to reach.

BACKGROUND ART

In recent years, attention has focused on electric vehicles (mobile bodies, electric cars, or simply vehicles) that travel on electrical energy stored in onboard batteries, such as electric cars, electric two-wheeled vehicles and the like. However, battery capacity is limited, and as such, the range that an electric vehicle is able to reach without charging the battery (hereinafter referred to as either the "driving range" or the "reachable range") is limited. Thus, techniques for calculating the reachable range of an electric vehicle and displaying the result thereof on a map are needed.

In particular, in the early stage of introducing electric cars onto the market, generally speaking, the distance an electric car is able to travel in a state in which the battery has been charged to maximum capacity is reportedly shorter than the distance a gasoline-powered vehicle is able to travel in a state in which the tank has been filled to maximum capacity. Also, charging facilities are not being established and maintained to the extent of gasoline stations, and, in addition, it is assumed that charging an electric car takes longer than refueling a gasoline-powered vehicle. Thus, informing the driver of the reachable range of an early electric car is particularly strongly needed.

In response to this requirement, claim 1 and paragraphs 0066 through 0068 of Patent Literature 1 disclose a technique for estimating the distance an electric car is able to travel over a set course by storing in a database an amount of power consumed in order to travel over respective segments (links) into which a road has been divided, and comparing the onboard state-of-charge to the power consumption of a link belonging to the course.

Furthermore, paragraphs 0056 and 0065 of Patent Literature 2 disclose a technique for acquiring various information, such as information on the current state-of-charge, and the configuration and gradient of a road in the vicinity of the vehicle, traffic information, and learning information calculated from past data, and on the basis of the various acquired information, calculating the range capable of being traveled on the current state-of-charge and displaying the calculated reachable range on a liquid crystal display.

CITATION LIST

Patent Literature

[PTL 1]
Japanese Patent Application Laid-open No. 2006-115623

[PTL 2]
Japanese Patent Application Laid-open No. 2009-025128

SUMMARY OF INVENTION

Technical Problem

The technique disclosed in Patent Literature 1 is for estimating the driving range over a set course, and the driving range cannot be calculated unless a destination and course have been set.

Alternatively, the technique disclosed in Patent Literature 2 is for calculating a reachable range based on road and traffic information in the vicinity of the vehicle and displaying this information on a map of the vicinity of the vehicle, and as such, is able to display a reachable range even when a destination and course have not been set.

However, in the technique of Patent Literature 2, it takes time to process a route search algorithm for computing the reachable ranges for the various courses on a network of roads in the vicinity of the vehicle to be retrieved without being limited to a specific course. It also takes time to perform an operation using various types of information, such as information on the configuration and gradient of the road, traffic information, and learning information. Thus, the computation of a reachable range takes time. So as not to stress out the driver, an approach is needed that lessens the computation process for a reachable range and can be executed in a shorter period of time.

The present invention provides a technique that enables the reachable range of a vehicle to the computed with little throughput.

Solution to Problem

A reachable range calculation apparatus in accordance with one embodiment of the present invention is for computing a range that a vehicle traveling on stored energy is able to reach, and comprises: a storage part for storing beforehand information on a required amount of energy stipulated as the energy to be consumed when the vehicle moves, using each of a plurality of areas into which a map has been divided as a unit; an integration part for integrating, with respect to movement of the vehicle from a specified origin to a surrounding area, a required amount of energy on the basis of the required amount of energy stored in the storage part, each time the vehicle moves between areas; and a range determination part for determining, on the basis of a provided specified amount of energy and an integrated required amount of energy obtained by the integration part integrating energy-consumption amounts, a reachable range, which is a range of areas that the vehicle is able to reach using the specified amount of energy.

Furthermore, a reachable range display method in accordance with another embodiment of the present invention is for displaying an area that a vehicle traveling on stored energy is able to reach, and comprises: a process for acquiring information on an origin of the vehicle; a process for using each of a plurality of areas into which a map has been divided as a unit, using a required amount of energy necessary for the vehicle to move from a certain area to an adjacent area, and on the basis of the acquired origin information, determining for each area an integrated required amount of energy necessary for the vehicle to move from the origin, and calculating a state-of-charge of the vehicle in the area; and a process for displaying, on a map, a reachability based on the state-of-charge of the vehicle in each of the areas, on the basis of the calculation result.

Advantageous Effects of Invention

According to the disclosure, it is possible to compute the reachable range of a vehicle with little throughput.

BRIEF DESCRIPTION OF DRAWINGS

FIG. 3 is a table showing an example of a graph 122 of the energy required between two adjacent cells.

FIG. 6 is a table showing an example of a graph 122 of the energy required between road points on the sides of a cell.

FIG. 7 is a drawing showing an example of a graph 122 of the energy required between group points.

DESCRIPTION OF EMBODIMENTS

Figure 1:
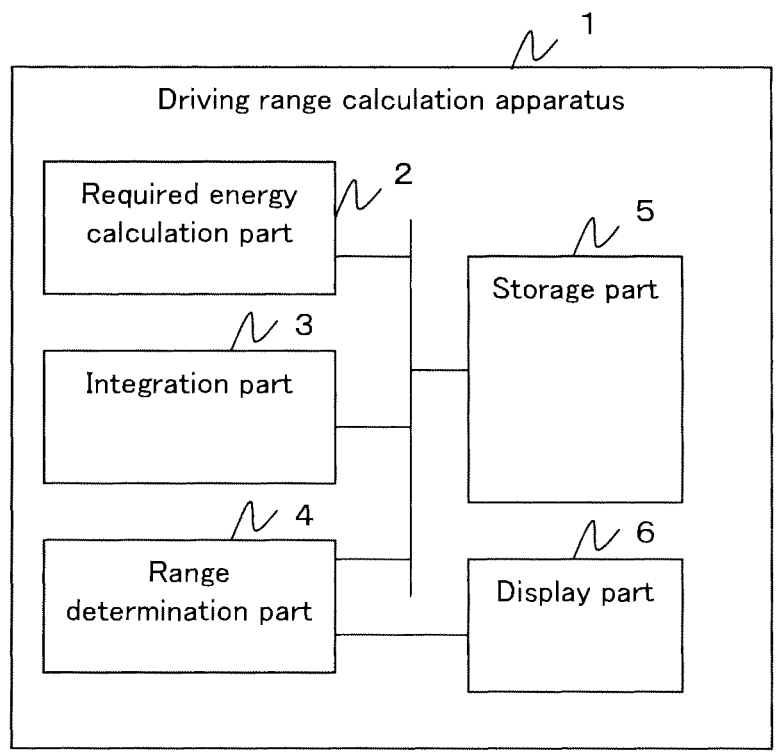
FIG. 1 is a block diagram showing the configuration of a driving range calculation apparatus according to this embodiment.

A basic embodiment of the present invention will be explained by referring to the drawings.

FIG. 1 is a block diagram showing the configuration of a driving range calculation apparatus according to this embodiment. As the basic configuration in this embodiment, a single apparatus calculates and displays a reachable range, but the present invention is not limited to this configuration.

The driving range calculation apparatus 1 of this embodiment is for computing a range capable of being reached traveling on stored energy by a vehicle like an electric car.

Referring to FIG. 1, the driving range calculation apparatus 1 comprises a required energy calculation part 2, an integration part 3, a range determination part 4, a storage part 5, and a display part 6.

The storage part 5 stores beforehand information on a required amount of energy, stipulated as the energy-consumption amount when the vehicle moves from a certain area to an adjacent area, having each of a plurality of areas into which a map has been divided as units. The required amount of energy, for example, is calculated by the required energy calculation part 2 and is recorded in the storage part 5. The required amount of energy may be provided beforehand and recorded in the storage part 5, or may be provided from an external apparatus, in which case there is no need for the required energy calculation part 2.

With respect to the movement of the vehicle from a user-specified origin to a surrounding area, the integration part 3 integrates the required amount of energy on the basis of the required amount of energy stored in the storage part 5, each time the vehicle moves between areas.

The range determination part 4 determines a reachable range, which is a range of areas that the vehicle is able to reach on a specified amount of energy, on the basis of a provided specified energy amount, such as a state-of-charge specified by the user and/or the actual state-of-charge of the battery, and an integrated required amount of energy obtained by the integration part 3 integrating energy-consumption amounts. The determined reachable range, for example, is displayed by the display part 6 on a map.

According to this embodiment, an operation for integrating a required amount of energy may be executed, having each of a plurality of areas into which a map has been divided as units, each time the vehicle moves between areas, thereby making it possible to compute the vehicle's reachable range with little throughput.

Also, in this embodiment, as one example, the storage part 5 stores required amount of energy information for a plurality of layers in which the areas obtained by dividing a map are of different sizes. Then, the integration part 3 selects a layer in accordance with a specified energy amount, and integrates the required amount of energy for the selected layer. As used here, a plurality of layers corresponds to a plurality of geographical data for which either the resolution or scale size differs. An individual area obtained by dividing up a map may be called a cell. The typical shape of a cell may be a quadrangle obtained by segmenting a map along the lines of latitude and longitude, or a polygon similar to a hexagon obtained by segmenting the map into a honeycomb-like shape.

When determining a reachable range using an origin that is within a prescribed distance range from the origin of the reachable range determined previously, the integration part 3 does not integrate the required amount of energy and the range determination part 4 determines the current reachable range by adjusting the previous reachable range in proportion to the change in the origin and the change in the specified energy amount. This makes it possible to further reduce the throughput.

Specifically, the required energy calculation part 2 calculates beforehand, as a required amount of energy in area units, the amount of energy that will be consumed after the vehicle enters the area until the vehicle exits the area, and records this required amount of energy in the storage part 5.

The integration part 3 may execute processing for the movement of the vehicle from the origin to the surrounding area in which, each time the vehicle moves from a certain area (a first area) to an area adjacent thereto (a second area), the required amount of energy for the first area is added to the integrated required amount of energy.

For example, the required energy calculation part 2 may calculate the required amount of energy for a road taken by the vehicle, and record this required amount of energy in the storage part 5 in area units.

Or, in a case where the area is a polygon having a plurality of sides, the required energy calculation part 2, on the basis of the energy-consumption amount in a certain area along each road that enters from a certain side (a first side) and exits from another certain side (a second side), may calculate the required amount of energy for each combination of the first side and the second side, and record this required amount of energy in the storage part 5 as the required amount of energy in area units.

Or, the required energy calculation part 2 may calculate the required amount of energy consumed after the vehicle enters a certain area until the vehicle exits the certain area for a road that has been extracted using a prescribed condition.

The processing may be executed in a sequential manner from a processing method with a short processing time from among a plurality of types of processing methods when the required energy calculation part 2 records the required amount of energy in the storage part 5, the integration part 3 integrates, with respect to movement of a vehicle from the origin to the surrounding area, the required amount of energy on the basis of the required amount of energy when the vehicle moves between areas, the range determination part 4 determines the reachable range, and the display part 6 displays the reachable range. A processing method having a short processing time generally has low accuracy and coarse resolution, but in accordance with this, although accuracy is low, a reachable range can first be displayed rapidly, and then the accuracy of the display can be gradually improved.

The display part 6 displays the reachable range on a map that includes all the areas in the reachable range, using the contour of the areas as a boundary. This makes it possible to keep the throughput for a display small since the reachable range is displayed in area (cell) units used in the operation. Or, the display part 6 may represent the reachable range using a flexible boundary rendered on a map so as to include at least a portion of the areas of the reachable range. There are cases in which the boundary lines lack flexibility when the reachable range is displayed in area units, and this makes it possible to display the reachable range in a flexible manner.

A series of processes in which the integration part 3 integrates, with respect to the movement of the vehicle from the origin to the surrounding area, the required amount of energy on the basis of the required amount of energy when the vehicle moves between areas, and the range determination part 4 determines the reachable range may be performed for a plurality of types of route search conditions. In this case, the display part 6 displays the reachable range for a user-specified route search condition from thereamong. Examples of route search conditions may be expressway preferred, ordinary road preferred, or distance preferred.

The driving range calculation apparatus 1 of this embodiment may further comprise a route search part (not shown in the drawing). In such a case, the route search part performs a route search from the specified origin to a destination, and determines a route. The display part 6 displays both the determined reachable range and the route, and, in addition, when the route extends beyond the reachable range, displays a warning. Specifically, when a route search process has been executed after all the processing for calculating the reachable range has ended, the cells through which the route outputted using the route search process passes may checked, and when even one of the cells through which the route passes falls outside the reachable range or is close to falling outside the reachable range, a warning to the effect "battery will run out partway through this route" may output.

In order to simplify the configuration in this embodiment, an example in which a single apparatus calculates and displays the reachable range has been given as the basic configuration, but the embodiment is not limited thereto. As another example, the configuration may be such that a request specifying a condition or the like is received from a terminal, the reachable range is calculated at a center, this information is notified to the terminal, and the terminal displays the reachable range. Examples of terminals include a personal computer (PC), a mobile telephone, a smartphone, and a car navigation system.

In such a case, the driving range calculation apparatus 1 installed in the center may further comprise a communication part (not shown in the drawing) for communicating with the terminal, and the communication part may receive a request from the terminal and transmit the reachable range information to the terminal. Furthermore, in such a case, when a condition that is either identical or similar to a reachable range calculated in the past is specified, the operational processing of the integration part 3 and the range determination part 4 may be omitted, and the information for the reachable range calculated in the past may be transmitted to the terminal. Since the center receives requests from a plurality of terminals, and calculates reachable ranges for a plurality of vehicles, requests having either identical or similar conditions could be received. In such a case, this makes it possible to omit the processing and reduce the load.

A number of more specific examples will be explained hereinbelow.

Example 1

A first example will be explained using the drawings.

In the first example, a server acquires the position and state-of-charge of an electric vehicle from the user terminal, calculates, from a digital map prepared beforehand, a reachable range using a required energy graph in which the areas that serve as units are coarse, and outputs the reachable range to the user terminal.

Figure 2:
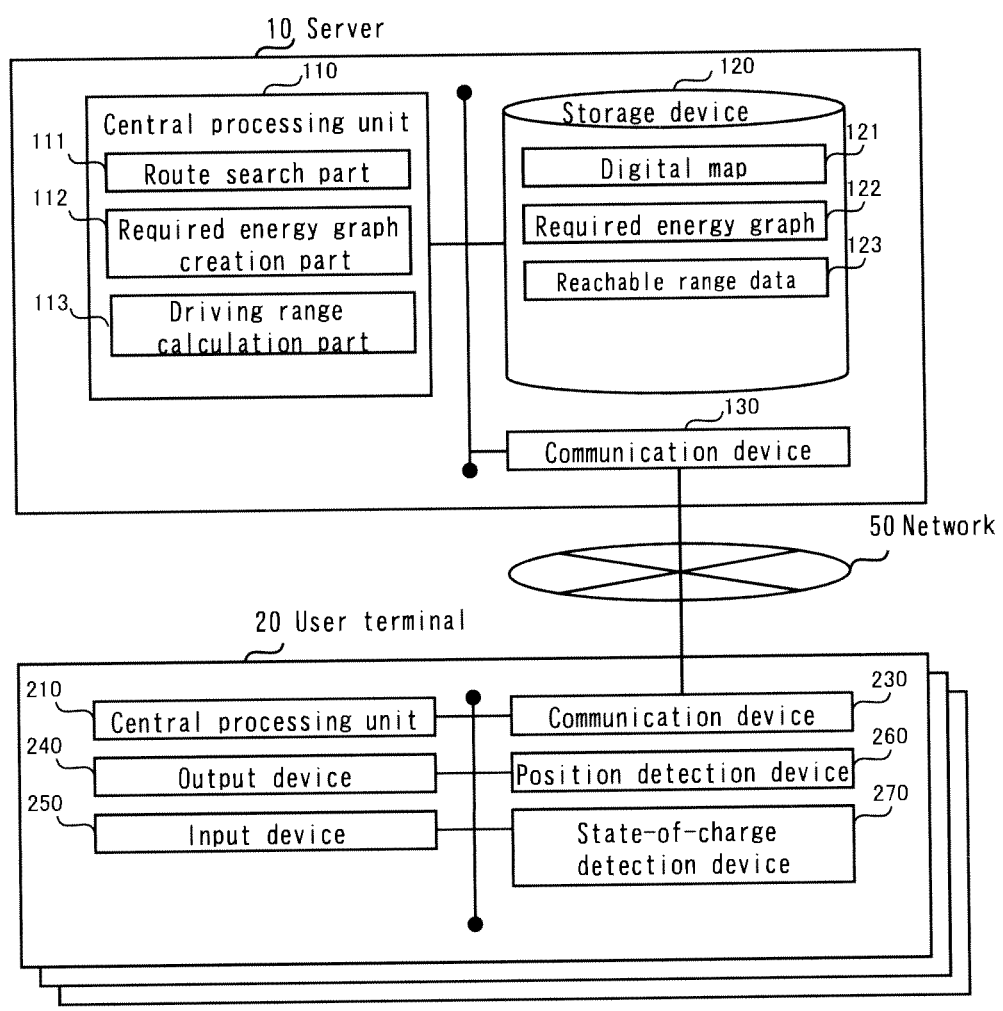
FIG. 2 is a drawing illustrating the configuration of a reachable range output system in a first example.

FIG. 2 is a drawing illustrating the configuration of a reachable range output system of the first example. As shown in the drawing, the reachable range output system comprises a server 10 for calculating the reachable range, a user terminal 20 to which the reachable range calculated by the server 10 is outputted, and a network 50 via which the server 10 and the user terminal 20 are connected. The server 10 and the user terminal 20 communicate via the network 50. A plurality of user terminals 20 is connected to a single server 10 via the network 50.

Or, the reachable range output system may provide a relay terminal (not shown in the drawing) in place of a user terminal 20, and the user terminals 20 may communicate with the server 10 via the relay terminal and the network 50. The relay terminal in this case is a PC that transfers data between the terminals 20 via a bridge media such as a USB memory. A plurality of relay terminals is connected to a single server 10 via the network 50. A relay terminal is connected to and performs data transfers with a plurality of user terminals 20 via the bridge media.

In this example, as described above, the reachable range output system is explained having as an example a mode for the server 10 and user terminal 20 to communicate via the network 50. However, all of the functions of the server 10 in the reachable range output system of this example may be provided by the user terminal 20 by itself. In this case, the user terminal 20 does not need to communicate with the server 10 via the network 50.

The server 10 may be included as a portion of the functions in a telematics service provider server or an ordinary application service provider (ASP) server. A telematics service integrates communications technology with an information service, and in Japan in particular may be a service that merges the internet with onboard wireless information technology.

The user terminal 20, for example, is an onboard device such as a car navigation system that is provided in an electric car, two-wheeled electric vehicle, or other such electric vehicle. Or, the user terminal 20 may be a PC or mobile telephone.

The network 50 may be a mobile telephone network, or may be an internet network.

The server 10 is connected to a storage device 120 and a communication device 130, and comprises a central processing unit (CPU) 110 for executing reachable range calculations, a storage device 120 comprising a hard disk or the like for storing a digital map 121, a required energy graph 122, and reachable range data 123, and a communication device 130 for connecting to the network 50.

The central processing unit 110, in accordance with executing a program, realizes a route search part 111 that uses the digital map 121 in the storage device 120 to search for a route, a required energy graph creation part 112 that uses the digital map 121 in the storage device 120 and the route search part 111 to create a required energy graph, and stores the created graph in the storage device 120 as the required energy graph 122, and a driving range calculation part 113 that receives position information, state-of-charge information, and so forth transmitted from the user terminal 20 via the communication device 130, uses the required energy graph 122 in the storage device 120 to calculate a reachable range, stores the calculated range in the storage device 120 as reachable range data 123, and transmits the reachable range data to the user terminal 20.

The required energy graph creation part 112 of FIG. 2 corresponds to the required energy calculation part 2 of FIG. 1. The driving range calculation part 113 of FIG. 2 is equivalent to the integration part 3 and the range determination part 4 of FIG. 1.

The digital map 121 comprises information on the configuration and gradient of a road for each road link, and is associated with traffic information. The route search part 111 carries out a route search, and, in addition, outputs the energy required for traveling the retrieved route.

The user terminal 20 comprises a central processing unit (CPU) 210, a communication device 230 such as a mobile telephone, PHS, or wireless LAN, an output device 240 such as a liquid crystal display or a speaker, an input device 250 such as a touch panel, a controller, or voice recognizer, a position detection device 260 for detecting the position of the user terminal 20 using a device corresponding to GPS, an optical beacon, or other such positional information transmitter, or an autonomous navigation device by such as vehicle-speed pulse or a gyroscope, and a state-of-charge detection device 270 for measuring the amount of charge left in the battery.

The central processing unit (CPU) 210 is connected to the communication device 230, the output device 240, the input device 250, the position detection device 260, and the state-of-charge detection device 270, and realizes functions for transmitting vehicle status information to the server 10, and receiving and outputting reachable range data from the server 10.

The position detection device 260 detects the position of an electric vehicle using GPS and the like. The state-of-charge detection device 270 measures the amount of charge remaining in the battery mounted in the electric vehicle. When the user terminal 20 is a PC or mobile telephone that is not mounted directly to the electric vehicle, the state-of-charge detection device 270 may connect to the network inside the electric vehicle via a USB or the like, and may acquire the state-of-charge via the in-vehicle network. Or, when the user terminal 20 is a PC or mobile telephone, instead of the position detection device 260 and state-of-charge detection device 270, the user may input positional information and state-of-charge information via the input device 250.

In this example, the user terminal 20 will be explained as an onboard apparatus such as a car navigation system equipped with a state-of-charge detection device.

FIG. 3 is a table showing an example of a graph 122 of the energy required between two adjacent cells.

The items of the required energy graph 122 are an ID 2111 for uniquely identifying a two-cell combination, a layer 2112 indicating each layer in which the size of the cell differs, a cell (o) 2114 representing a cell identifier that is the origin from among two cells, a cell (d) 2115 representing a cell identifier that is the destination from among the two cells, a cost 2116 representing the energy required for traveling the distance of one cell from (for example, the center of) the cell (o) 2114 to (for example, the center of) the cell (d) 2115, a vehicle type 2117 representing the type of vehicle corresponding to the cost 2116, and a time period 2118 corresponding to the cost 2116.

The required energy graph 122 is a digraph, and two pieces of data in which the value of the cell (o) 2114 and the value of the cell (d) 2115 switch places is stored for the same two-cell combination as in the ID 2111 values "1890" and "1893" in FIG. 3.

The energy required for traveling is generally said to depend on the type of vehicle, such as the vehicle weight, wind resistance, and so forth, and the congestion factor of the road. Therefore, when two or more types of target vehicles exist (when two or more types of vehicles are defined as the target vehicle types), the target vehicle types are distinguished in the vehicle type 2117, and a cost 2116 is configured for each vehicle type 2117.

Also, the energy required for traveling is generally said to depend on the way the driver drives, and as such, the vehicle type 2117 may be replaced with the type of driver. In addition, when the road congestion factor changes in accordance with the time period, the congestion factor is distinguished by the time period 2118, and a cost 2116 is configured for each time period 2118. As the time period 2118 values, there are values indicating "weekday morning", "weekday afternoon", "weekday evening", "weekday late night", "holiday morning", "holiday afternoon", "holiday evening", and "holiday late night".

As used here, a cell refers to planar area obtained by segmenting a map using polygonal sides. For example, each quadrangular area obtained by dividing a map along the lines of latitude and longitude is a cell. The cell shape may be standardized as a polygon, such as a quadrangle, a triangle, or a hexagon, or may be a combination of different polygons. In this example, the cell shape is assumed to be a quadrangle.

A layer represents each of a plurality of digital maps having different cell sizes. In this example, when the value of a layer is 1, it is assumed that the difference in latitude between adjacent cells is five minutes, and the difference in longitude is seven minutes 30 seconds, when the value of a layer is 2, it is assumed that the difference in latitude between adjacent cells is two minutes 30 seconds, and the difference in longitude is three minutes 45 seconds, and when the value of a layer is 3, it is assumed that the difference in latitude between adjacent cells is one minute 15 seconds, and the difference in longitude is one minute 52.5 seconds.

Figure 4A:
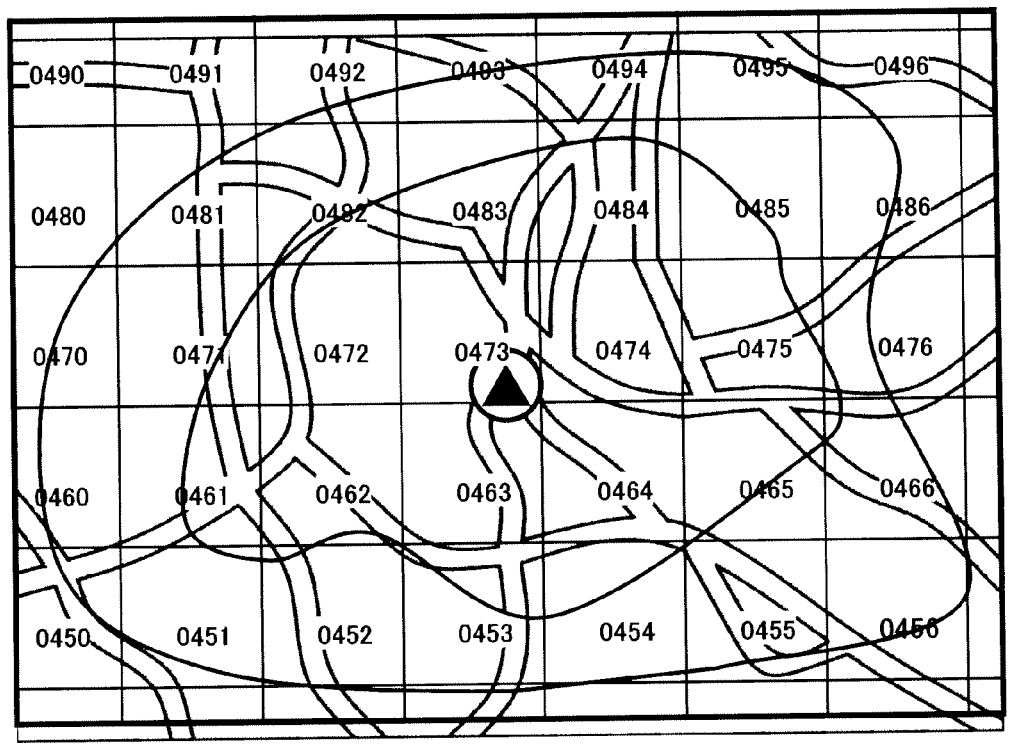
FIG. 4A is a drawing showing an example of a map display screen displayed on an output device 240 of a user terminal 20.

FIG. 4A is a drawing showing an example of a map display screen displayed on the output device 240 of the user terminal 20.

It is assumed here that the cell is quadrangular, and the value of the layer is 2. The number written inside each quadrangular area divided along the lines of latitude and longitude is a cell identifier that is used in either the cell (o) 2114 or the cell (d) 2115 of the required energy graph 122 in FIG. 3.

Next, the method by which the required energy graph creation part 112 realized by the central processing unit (CPU) 110 mounted in the server 10 creates the graph 122 of the energy required between two adjacent cells in FIG. 3 will be explained below.

First, the required energy graph creation part 112 reads out the digital map 121, and selects one cell in an arbitrary layer. For example, it is assumed that the required energy graph creation part 112 selects the cell having the cell identifier 0473 from among the cells when the layer value is 2 as in FIG. 4A. In accordance with this, the required energy graph creation part 112 stores "2" in the layer 2112 and stores "0473" in the cell (o) 2114 of the required energy graph 122 in FIG. 3.

Next, the required energy graph creation part 112 causes the route search part 111 to execute processing from the center of the selected cell to the centers of each of the four adjacent cells, and determines the energy required to travel to the adjacent cells. Furthermore, when a road does not exist in a cell, the amount of energy is regarded as infinitely large. The amount of energy may also be regarded as infinitely large when there is no road in the vicinity of the center of a cell. For example, when the selected cell identifier is 0473, the identifiers of the cells adjacent thereto are 0463, 0472, 0474, and 0483 as in FIG. 4A. The required energy graph creation part 112 determines the required energy by searching for a route from the center of cell 0473 to the center of cell 0463. In accordance with this, the required energy graph creation part 112 stores the adjacent cell identifier in the cell (d) 2115 and stores the required energy determined by searching for a route in the cost 2116 of the required energy graph 122 of FIG. 3.

When two or more types of vehicle types exist, the required energy graph creation part 112 determines the required energy by searching for a route for each vehicle type, and stores the corresponding type of vehicle in the vehicle type 2117 when storing the required energy in the cost 2116.

When the road congestion factor changes in accordance with the time period, the required energy graph creation part 112 determines the required energy by searching for a route for each time period, and stores the corresponding time period in the time period 2118 when storing the required energy in the cost 2116.

The inter-cell cost 2116 may be determined in a simple fashion without using the route search part 111 by adding the difference in elevation between the centers of two cells to the energy required when traveling a straight road that is flat. For example, the energy required to travel the distance between the centers of two cells over a straight flat road is W0, and when the difference in elevation between the centers of the two cells is a (a>0: ascent, a<0: descent), the required energy W may be calculated based on the formula $W=W0+k1 \times a/l$ (k1: coefficient, l: distance between centers of cells).

In addition, the inter-cell cost 2116 may be determined in a simple fashion by adding the number of nodes between the two cells and a road congestion factor percentage to the above-described formula. For example, when the number of nodes between the two cells is b, and the road congestion factor percentage is c (c: percentage of average speed on road in target range relative to speed for traveling over straight flat road), the required energy W may be calculated based on the formula $W=W0+k1 \times a/l+k2 \times b/l^2+k3 \times (1-c)$ (k1, k2, k3: coefficients, l: distance between centers of cells).

The required energy graph creation part 112 executes the above processing for all the cells in all the layers.

By executing these procedures beforehand, the required energy graph creation part 112 creates the graph 122 of the energy required between two adjacent cells of FIG. 3. The process for creating the required energy graph 122 is started by the server 10 operator at the time at which the digital map 121 is updated (for example, once every four months).

Figure 5:
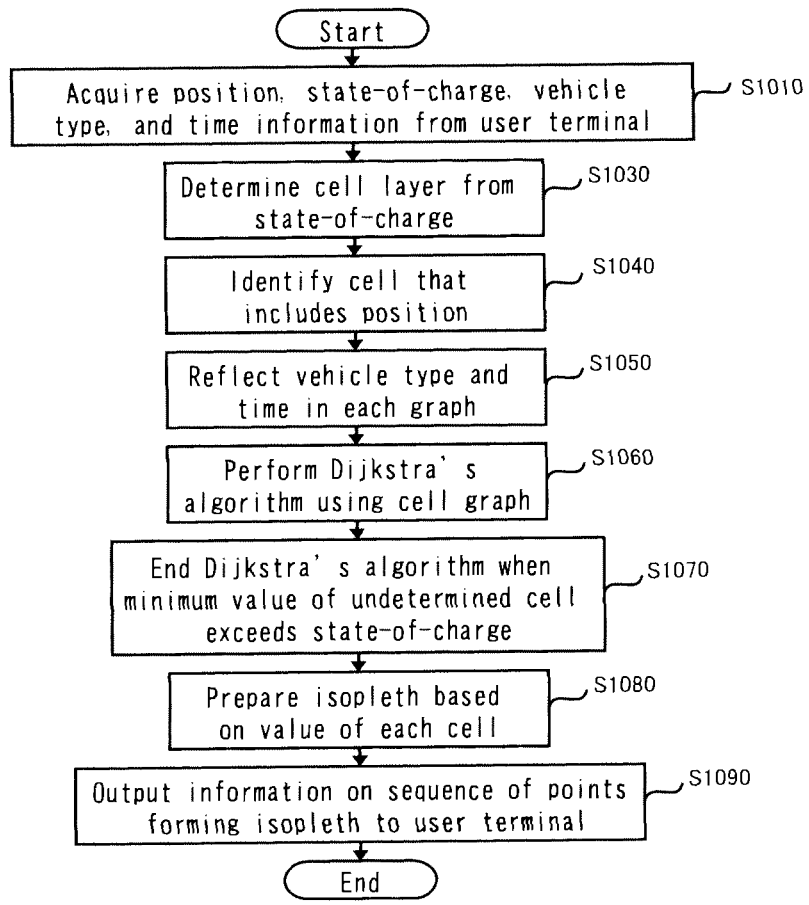
FIG. 5 is a flowchart showing the processes by which a driving range calculation part 113 realized by the central processing unit (CPU) 110 mounted in a server 10 calculates and outputs a reachable range.

FIG. 5 is a flowchart showing the processes by which a driving range calculation part 113 realized by the central processing unit (CPU) 110 mounted in a server 10 calculates and outputs a reachable range.

The user, who is using the user terminal 20, inputs a request using the input device 250 mounted in the user terminal 20, and in response thereto, the central processing unit (CPU) 210 mounted in the user terminal 20 transmits a driving range request to the server 10 via the network 50. The driving range calculation part 113 of the server 10 starts the process in response to receiving the driving range request.

The latitude and longitude of the current position of the user terminal 20, the state-of-charge, the vehicle type, the departure time period, the vehicle weight, and so forth are included in the driving range request. The latitude and longitude of the current position is a required item, and the driving range calculation part 113 of the server 10 issues an error response for a driving range request in which the current position latitude and longitude are not included. A layer and cell identifier that include the latitude and longitude of the current position may be included in the driving range request in place of the current position latitude and longitude.

Alternatively, the state-of-charge, the vehicle type, the departure time period, the vehicle weight, and so forth are arbitrary items. For items not included (not specified) in the driving range request from among the state-of-charge, the vehicle type, the departure time period, and the vehicle weight, the driving range calculation part 113 performs processing by using pre-configured initial values. For example, the initial value of the state-of-charge is "20000 Wh", the initial value of the vehicle type is "C", the initial value of the departure time period is "weekday afternoon", and the initial value of the vehicle weight is "1700 kg".

The information regarding the current position latitude and longitude, the state-of-charge, the vehicle type, the departure time period, and the vehicle weight incorporated in the driving range request may be values that have been automatically detected by the central processing unit (CPU) 210 of the user terminal 20 using respective detection apparatuses, or may be values that the user, who is using the user terminal 20, has inputted using the input device 250 of the user terminal 20. For example, for the vehicle weight, the user may input a passenger configuration (a number of adults and a number of children) using the input device 250 of the user terminal 20, and may add the weight of the passengers calculated from the passenger configuration to the weight of the vehicle itself.

The driving range calculation part 113 receives the items that have been specified from among the current position latitude and longitude, which is a required item, and the state-of-charge, the vehicle type, the departure time period, the vehicle weight and so forth, which are arbitrary items, included in the driving range request transmitted by the user terminal 20 (Step S1010). For items that are not included (specified) in the driving range request from among the state-of-charge, the vehicle type, the departure time period, and the vehicle weight, the initial values are used instead of values received from the user terminal 20.

Next, from the state-of-charge received in Step S1010, the driving range calculation part 113 determines the value of the layer corresponding thereto (Step S1030). In this example, the larger the state-of-charge, the higher the layer used, that is, the driving range calculation part 113 uses a layer with a larger area. For example, when the state-of-charge is 10000 Wh or more, the layer value is assumed to be 1, when the state-of-charge is equal to or greater than 5000 Wh but less than 10000 Wh, the layer value is assumed to be 2, and when the state-of-charge is less than 5000 Wh, the layer value is assumed to be 3. For example, when the state-of-charge received from the user terminal 20 is 5200 Wh, the layer value is 2.

Next, the driving range calculation part 113 references the digital map 121, and locates the cell identifier of the cell that includes the current position latitude and longitude received in Step S1010 on the layer determined in Step S1030 (Step S1040). For example, when the current position is the position of the triangle in FIG. 4A, the cell identifier is 0473.

Next, the driving range calculation part 113 references the required energy graph 122, and extracts the layer determined in Step S1030, and only the records (rows) corresponding to the vehicle type and departure time period received in Step S1010 (Step S1050). The cost 2116 in the required energy graph 122 may be adjusted taking into account fluctuations in the vehicle weight received in Step S1010.

Next, the driving range calculation part 113 references the graph extracted in Step S1050, makes the cell located in Step S1040 the origin, sequentially adds the cost of the cells adjacent thereto, and configures an integration value obtained by the addition in the cells for which the costs were added. When a plurality of integration values exists for a single cell, the smallest integration value is used. For example, regarding cell 0464, costs may be integrated using a route that originates in cell 0473 and passes through cell 0474 to get to cell 0464, or costs may be integrated using a route that originates in cell 0473 and passes through cell 0463 to get to cell 0464. Whichever is the smaller of the cost integration value when the vehicle passes through cell 0474 and the cost integration value when the vehicle passes through cell 0463 is used as the cost integration value of cell 0464 at this time. Or, the driving range calculation part 113 may reference the graph extracted in Step S1050, perform Dijkstra's algorithm for determining a route that has the cell located in Step S1040 as the origin, and configure the cost integration values for each cell (Step S1060).

In Step S1060, when the driving range calculation part 113 makes the cell located in Step S1040 the origin and adds the costs of cells that are side-by-side in a certain layer (adjacent cells), the driving range calculation part 113 may reference the graph for the layer having the highest resolution (that is, the lowest layer), integrate the costs to the centers of the adjacent cells, and thereafter perform integration using the graph for the layer selected in Step S1030.

Next, the driving range calculation part 113 ends the processing of Step S1060 either when the cost integration value has been configured for all the cells, when the cost integration value of peripheral cells for which costs have been configured exceeds the state-of-charge received in Step S1010, or when Dijkstra's algorithm was performed, and the minimum value of the cost integrated values configured for cells that were not determined by Dijkstra's algorithm exceeds the state-of-charge received in Step S1010 (Step S1070).

In Step S1070, when the cost integration value of the peripheral cells for which costs were configured exceeds the state-of-charge, the driving range calculation part 113 may reference the graph of the layer having the highest resolution (that is, the layer at the lowest level) for the cells having integration values in excess of the state-of-charge, and perform cost integration in detail using a small cell.

Next, the driving range calculation part 113 uses the cost integration values configured for the cells in Step S1060 to prepare an isopleth on the digital map 121 (Step S1080). The isopleth is a curved line that connects points on the map where the cost-indicated energy is equal to the state-of-charge received in Step S1010. An isopleth that serves as a set of a plurality of curved lines connecting points that are each equal to a value obtained by multiplying a numerical value indicating a percentage, such as, for example, 1.0, 0.75, 0.5 and so forth, may also be prepared for the state-of-charge received in Step S1010. Or, a polygonal periphery obtained by arranging cells for which the cost integration values configured for the cells are smaller than the state-of-charge received in Step S1010 may serve as the isopleths. Colors and/or patterns that differ from one another may be provided between each isopleth.

In addition, the driving range calculation part 113 outputs as reachable range information a sequence of points of latitude and longitude that form the isopleth prepared in Step S1080, and ends the processing for calculating the reachable range (Step S1090). The reachable range information outputted by the driving range calculation part 113 is transmitted from the communication device 130 of the server 10 via the network 50 as a response to the user terminal 20 that transmitted the driving range request. The central processing unit (CPU) 210 mounted in the user terminal 20 that received the reachable range information outputs the reachable range information from the output device 240 to the user who is using the user terminal 20.

According to the Example 1 explained hereinabove, it is possible to present a driver or other user with an accurate reachable range using little processing. By using this example to support a driver in such as way that a mobile object such as an electric vehicle does not run out of battery power while traveling, it is possible to provide the driver with a sense of security and to contribute toward accelerating the widespread use of electric vehicles.

Figure 4B:
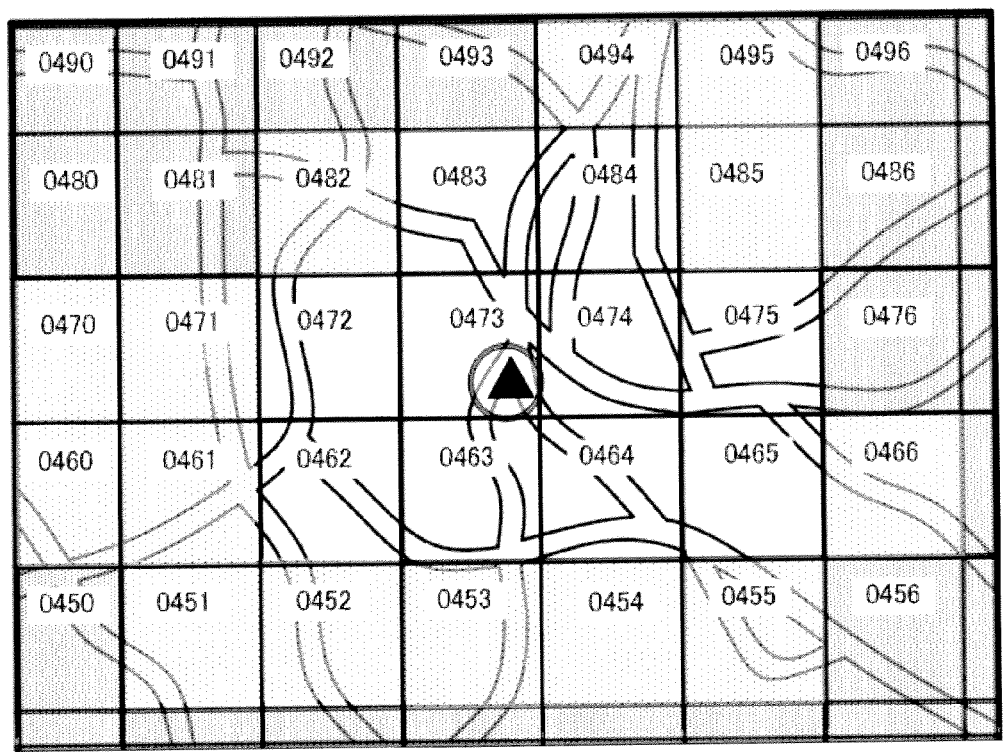
FIG. 4B is a drawing showing another example of a map display screen displayed on the output device 240 of the user terminal 20.

The example given here, as shown in FIG. 4A, displays reachable ranges that differ for each state-of-charge using a plurality of smooth isopleths, but the embodiment is not limited thereto. The reachable range may also be displayed along the contour of the cells. FIG. 4B is a drawing showing another example of a map display screen displayed on the output device 240 of the user terminal 20. In FIG. 4B, the reachable range is displayed having the contour of the cells as the boundary so as to include all the cells in the reachable range. In accordance with this, the reachable range is displayed in cell units, thereby making it possible to minimize the throughput for the display. For example, a reachable range that differs for each state-of-charge may be displayed by displaying the boundary line, and using a different color and/or pattern on the inner and outer sides of the boundary line.

According to this example, since reachability is determined by comparing the cost integration value to the state-of-charge, even when an area in which the required cost is greater than the state-of-charge, such as a mountain peak, is included within the reachable range, it is possible to display this area as being outside the reachable range. The reachable range can be presented to the user in an easy-to-understand manner at this time by displaying the cells using different colors and/or patterns.

Example 2

A second example will be explained using the drawings.

In a second example, a server also acquires the position and state-of-charge of an electric vehicle from a user terminal, calculates a reachable range using a required energy graph having as units areas that are coarser than a digital map prepared beforehand, and outputs the reachable range to the user terminal.

The second example makes it possible to calculate a more accurate reachable range by manipulating a more detailed spot in the required energy graph as a point rather than using a graph in which a cell is the point as in the first example.

The drawing for illustrating the configuration of the reachable range output system in the second example is identical to FIG. 2 illustrating the configuration of the reachable range output system in the first example.

FIG. 6 is a table showing an example of a graph 122 of the energy required between road points on the sides of a cell. A node where a road crosses the sides of adjoining cells is regarded as a road point here, and a graph of the energy required between road points is shown.

The items of the required energy graph 122 are an ID 2121 for uniquely identifying a combination of two road points, a layer 2122 indicating layers in which the size of the cells differs respectively, a cell 2123 indicating a cell in which a road that connects a road point (o) 2124 to a road point (d) 2125 exists, a cost 2126 representing the energy required to travel from road point (o) 2124 to road point (d) 2125, where road point (o) 2124 represents the road point identifier constituting the origin of the two road points and road point (d) 2125 represents the road point identifier constituting the destination of the two road points, a vehicle type 2127 representing the type of vehicle corresponding to the cost 2126, a time period 2128 corresponding to the cost 2126, and a road type 2129 representing the type of road that connects the road point (o) 2124 to the road point (d) 2125.

As used here, layer and cell are identical to the layer and the cell in the first example. The vehicle type 2127 and the time period 2128 here are identical to the vehicle type 2117 and the time period 2118 in the first example. Examples of the road type 2129 are "expressway", "main road", and "ordinary road". When the types of roads in the road type 2129 are listed in order from the least numerous road in the digital map 121, generally speaking, the order is "expressway", "main road", and "ordinary road". When the road connecting the road point (o) 2124 to the road point (d) 2125 comprises a plurality of roads of different types, the value of the road type 2129 may be the type of road for which the ratio of the road length is the largest, or may be the type of road of which there are the fewest number in the digital map 121.

FIG. 7 is a drawing showing an example of a graph 122 of the energy required between group points.

FIG. 7 is a table showing an example of a graph 122 of the energy required between group points on the sides of a cell. The items of the required energy graph 122 are an ID 2131 for uniquely identifying a combination of two group points, a layer 2132 having cells of different sizes, a cell 2133 indicating a cell in which a network that connects a group point (o) 2134 to a group point (d) 2135 exists, a cost 2136 representing the energy required to travel from group point (o) 2134 to group point (d) 2135, where group point (o) 2134 represents the group point identifier constituting the origin of the two group points and group point (d) 2135 represents the group point identifier constituting the destination of the two group points, a vehicle type 2137 representing the type of vehicle corresponding to the cost 2136, and a time period 2138 corresponding to the cost 2136. As used here, the layer 2132, the cell 2133, the vehicle type 2137, and the time period 2138 are identical to the layer 2122, the cell 2123, the vehicle type 2127, and the time period 2128 in FIG. 6. A group point can be likened to a single point that brings together one or more road points existing on one side of a cell.

Figure 8:
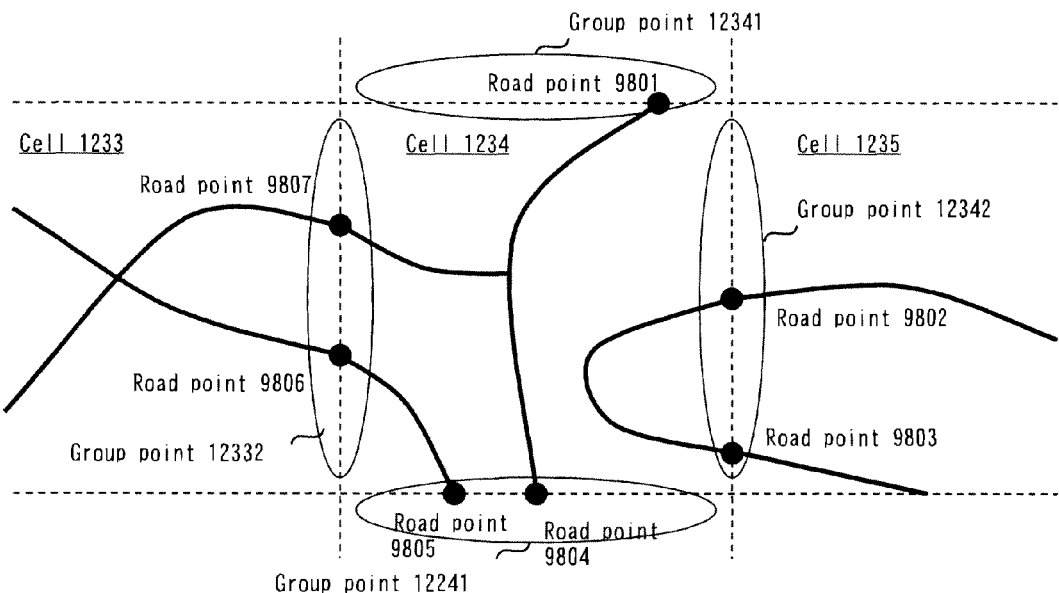
FIG. 8 is a drawing showing an example of cells, road points, and group points.

FIG. 8 is a drawing showing an example of cells, road points, and group points.

Seven road points comprising road points 9801 through 9807 exist in cell 1234. Group point 12341 comprises road point 9801, group point 12342 comprises road point 9802 and road point 9803, group point 12241 comprises road point 9804 and road point 9805, and group point 12332 comprises road point 9806 and road point 9807.

Figure 9:
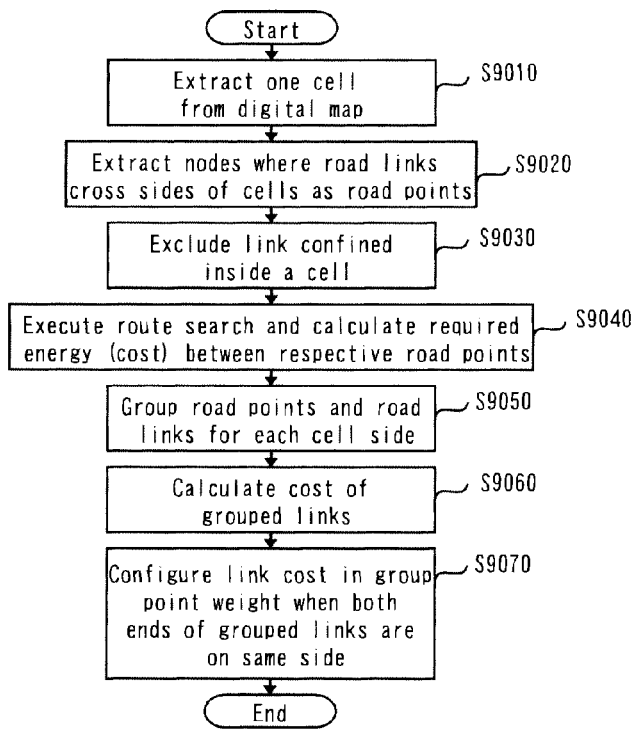
FIG. 9 is a flowchart showing the processing by which a required energy graph creation part 112 creates a graph 122 of the energy required between road points and a graph 122 of the energy required between group points.

FIG. 9 is a flowchart showing the processing by which a required energy graph creation part 112 creates a graph 122 of the energy required between road points and a graph 122 of the energy required between group points. In this arrangement, the required energy graph creation part 112, which is realized by the central processing unit (CPU) 110 mounted in the server 10, creates the graph 122 of the energy required between road points on the sides of a single cell of FIG. 6, and the graph 122 of the energy required between group points on the sides of a single cell of FIG. 7.

The required energy graph creation part 112 of the server 10 reads out the digital map 121, and selects one cell from within an arbitrary layer (Step S9010). For example, as in FIG. 8, it is assumed that the cell having the cell identifier 1234 is selected from among the cells when the layer value is 2. In accordance with this, "2" is stored in the layer 2122 and "1234" is stored in the cell 2123 of the required energy graph 122 of FIG. 6, and "2" is stored in the layer 2132 and "1234" is stored in the cell 2133 of the required energy graph 122 of FIG. 7.

The required energy graph creation part 112 reads out the digital map 121, and extracts, as road points, the nodes on the sides of the cell where roads cross the respective sides of the cell selected in Step S9010 (Step S9020). For example, when the selected cell is cell 1234, as in FIG. 8, there are seven road points 9801 through 9807.

Also, when the road connected to a road point from among the road points extracted in Step S9020 does not have a branch and ends inside the cell, the required energy graph creation part 112 excludes this road point (Step S9030).

Next, when one or less road points remain on the sides of the cell selected in Step S9010 after having been extracted in Step S9020 and excluded in Step S9030, the required energy graph creation part 112 does nothing. When two or more road points remain after the extraction processing in Step S9020 and the exclusion processing in Step S9030, the required energy graph creation part 112 causes the route search part 111 to execute processing respectively for all combinations of two road points, and determines the energy required to travel between two road points (Step S9040).

In so doing, when the road connecting two road points passes outside of the cell, the required energy graph creation part 112 excludes this two-road-point combination and does not determine the energy required for traveling between the two road points. For example, when the identifier of the selected cell is 1234, as in FIG. 8, as road points that can be combined with road point 9801, there are the six road points labeled road point 9802 through road point 9807. However, upon doing route searches from road point 9801 to road point 9802 through road point 9807, respectively, either routes do not exist from road point 9801 to road point 9802, road point 9803, road point 9805, or road point 9806, or the route is excluded because it passes outside of the cell 1234. The required energy graph creation part 112 determines the energy required for the route from road point 9801 to either road point 9804 or road point 9807.

In accordance with this, in the required energy graph 122 of FIG. 6, "9801" is stored in the road point (o) 2124, road point "9804" and road point "9807", which connect to road point 9801, are stored in the road point (d) 2125, and the required energy determined by performing route searches is stored in the cost 2126.

In a case where two or more types of vehicle types exist, when route searches are performed for each vehicle type and the required energy is determined and stored in the cost 2126, the corresponding vehicle type is stored in the vehicle type 2127. Also, in a case where the road congestion factor changes in accordance with the time period, when route searches are performed for each time period and the required energy is determined and stored in the cost 2126, the corresponding time period is stored in the time period 2128. When the road connecting the road point (o) 2124 and the road point (d) 2125 comprises roads of a plurality of different road types, the road type having the largest percentage of the road length may be stored in the road type 2129, or the road type having the fewest number of roads in the digital map 121 may be stored in the road type 2129.

Next, for the road points remaining after having been extracted in Step S9020 and subjected to the processing of Step S9030, the required energy graph creation part 112 collects together one or more road points that exist on one side of the cell selected in Step S9010, and defines this collection of road points as a group point (Step S9050). For example, as in FIG. 8, road point 9802 and road point 9803 exist on the same side, and as such, these road points are collected together and defined as group point 12342.

Next, when a group point defined in Step S9050 does not exist on a side of the cell selected in Step S9010, the required energy graph creation part 112 does nothing. When two or more group points have been defined in Step S9050, the required energy graph creation part 112 determines the energy required for traveling between two group points for all two-group-point combinations (Step S9060).

As the energy required for traveling between two group points, either the average value, the maximum value, or the minimum value of the cost 2126 between the road points included in the group points may be used. For example, when the identifier of the selected cell is 1234, as in FIG. 8, as the energy required to travel from group point 12241 to group point 12332, the required energy graph creation part 112 may use the average value "150" of the cost 2126 value "200" from the road point 9804 included in the group point 12241 to the road point 9807 included in the group point 12332 and the cost 2126 value "100" from the road point 9805 included in the group point 12241 to the road point 9806 included in the group point 12332. In accordance with this, "12241" is stored in the group point (o) 2134, "12332" is stored in the group point (d) 2135, and "100" is stored in the cost 2136 in the required energy graph 122 of FIG. 7.

In a case where two or more types of vehicle types exist, when the required energy for each vehicle type has been determined and stored in the cost 2136, the required energy graph creation part 112 stores the corresponding vehicle type in the vehicle type 2137. In addition, in a case where the road congestion factor changes in accordance with the time period, when the required energy for each time period has been determined and stored in the cost 2136, the required energy graph creation part 112 stores the corresponding time period in the time period 2138.

In addition, in a case where there is one group point defined in Step S9050 as being on a side of the cell selected in Step S9010, and two or more road points included in the single group point are connected to the same road and form a closed loop, the required energy graph creation part 112 determines the energy required to return to the group point from the group point (Step S9070). As the energy required to depart from and return to the group point, the required energy graph creation part 112 may use the average value, the maximum value, or the minimum value of the cost 2126 between the road points included in the group point. For example, when the identifier of the selected cell is 1234, as in FIG. 8, as the energy required to return to the same group point 12342 from the group point 12342, the required energy graph creation part 112 may use the average value "160" of the cost 2126 value "160" from the road point 9802 to the road point 9803 included in the group point 12342 and the cost 2126 value "160" in the reverse direction from the road point 9803 to the road point 9802. In accordance with this, "12342" is stored in the group point (o) 2134 the group point (d) 2135, and "160" is stored in the cost 2136 in the required energy graph 122 of FIG. 7.

The required energy graph creation part 112 ends the processing for creating the required energy graph after executing the above processing for all the cells in all the layers. In accordance with these procedures, the required energy graph creation part 112 creates the graph 122 of energy required between road points on the sides of a single cell of FIG. 6, and the graph 122 of energy required between group points on the sides of a single cell of FIG. 7. The processing for creating the required energy graphs 122 is started by the operator of the server 10 when updating the digital map 121 (for example, once every four months).

Figure 10:
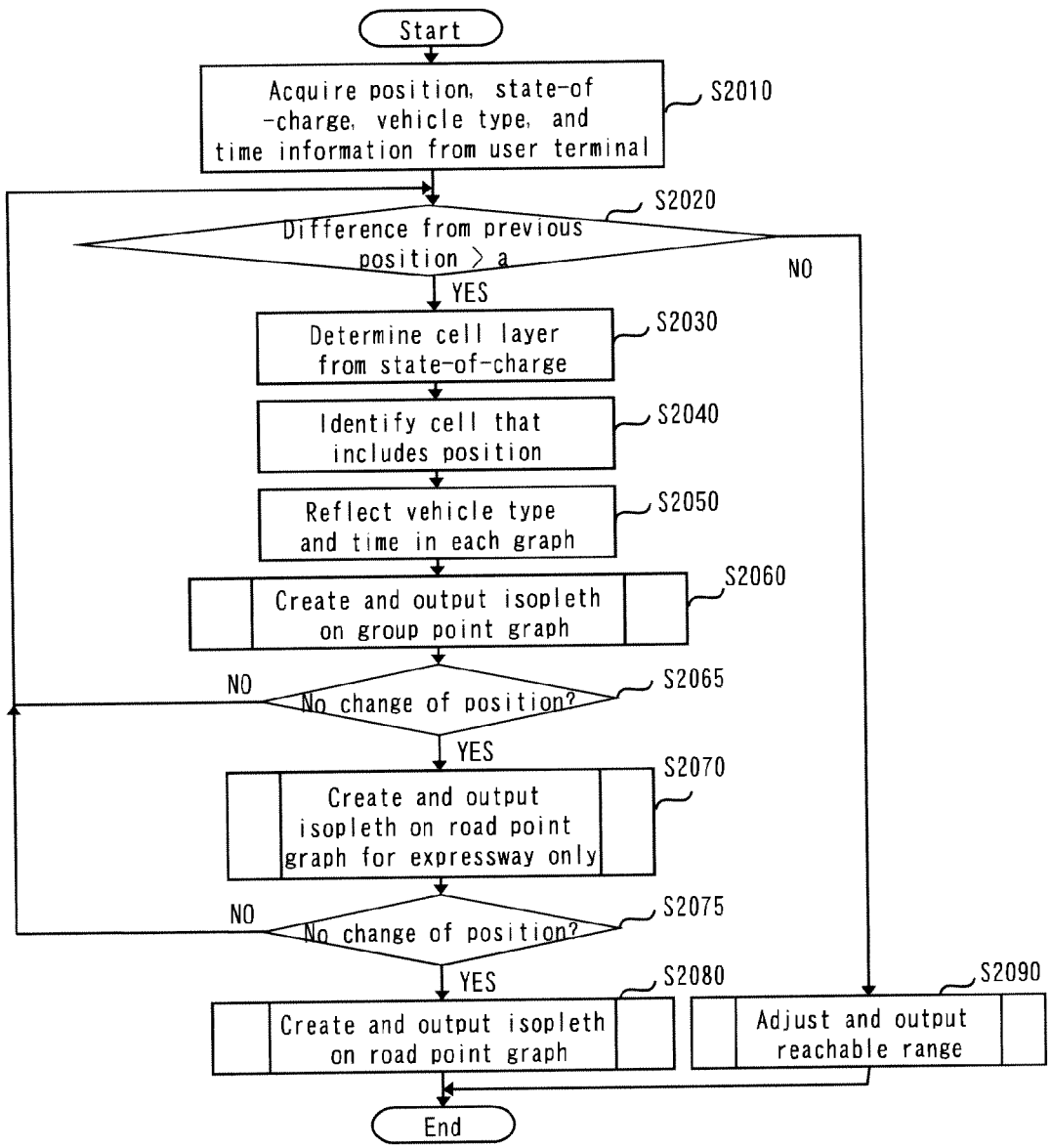
FIG. 10 is a flowchart showing the processes by which the driving range calculation part 113 realized by the central processing unit (CPU) 110 mounted in the server 10 calculates and outputs a reachable range.

FIG. 10 is a flowchart showing the processes by which the driving range calculation part 113 realized by the central processing unit (CPU) 110 mounted in the server 10 calculates and outputs a reachable range.

The user, who is using the user terminal 20, inputs a request using the input device 250 mounted in the user terminal 20, and in response thereto, the central processing unit (CPU) 210 mounted in the user terminal 20 transmits a driving range request to the server 10 via the network 50. In response to receiving the driving range request, the driving range calculation part 113 of the server 10 starts the process. The driving range request is identical to the driving range request in the first example.

The driving range calculation part 113 of the server 10 receives the items that have been specified from among the current position latitude and longitude, which is a required item, and the state-of-charge, the vehicle type, the departure time period, the vehicle weight, and so forth, which are arbitrary items, included in the driving range request transmitted by the user terminal 20 (Step S2010). For items that are not included (specified) in the driving range request from among the state-of-charge, the vehicle type, the departure time period, and the vehicle weight, the initial values are used instead of values received from the user terminal 20.

When the difference in the straight-line distance between the position acquired previously and the position received by the driving range calculation part 113 in the current Step S2010 is larger than a prescribed value α, or when the previously acquired position does not exist, the driving range calculation part 113 transitions to Step S2030. When the difference between the position acquired previously and the position received in the current Step S2010 is equal to or less than the prescribed value α, the driving range calculation part 113 transitions to Step S2090 (Step S2020).

Not only the positional difference, but a time period difference between the time at which the previous position was acquired and the time at which the current position was acquired, and/or the difference between a previous state-of-charge and the current state-of-charge may be taken into account. For example, the driving range calculation part 113 transitions to Step S2030 when at least one of the following applies: a case in which the difference between the position acquired previously and the current position received in Step S2010 is larger than the prescribed value α; a case in which the difference between the time at which the previous position was acquired and the time at which the current position was acquired is greater than a prescribed value; a case in which the difference between the previous state-of-charge and the current state-of-charge is greater than a prescribed value; or a case in which a previously acquired position does not exist.

In cases in which the difference between the previously acquired position and the current position received in Step S2010 is equal to or less than the prescribed value α, the difference between the time at which the previous position was acquired and the time at which the current position was acquired is equal to or less than a prescribed value, and the difference between the previous state-of-charge and the current state-of-charge is equal to or less than a prescribed value, the driving range calculation part 113 may transition to Step S2090.

The conditions used to calculate the current reachable range are not limited to previous information from the same user terminal 20 as the user terminal 20 that issued the current request. Even when a request is from a user terminal 20 that differs from the previous user terminal 20, the driving range calculation part 113 may transition to Step S2090 as long as the difference between the position of the vehicle that issued the previous request and the position of the vehicle that issued the current request meets the condition of being equal to or less than the value α.

The processing of the driving range calculation part 113 in Steps S2030 through S2050 is identical to the processing of the driving range calculation part 113 in Steps S1030 through S1050 of the first example.

Next, the driving range calculation part 113 references the graph of energy required between group points extracted in Step S2050 and outputs the reachable range (Step S2060). The process of outputting the reachable range will be explained in detail later using FIG. 11.

Next, the driving range calculation part 113 checks whether or not there has been a change in the position received in Step S2010, and when there has been no change in position, transitions to Step S2070. What there has been a change in position, the driving range calculation part 113 transitions to Step S2020 (Step S2065).

Next, the driving range calculation part 113 restricts the referencing of the graph for energy required between road points extracted in Step S2050 to only the record(s) (row(s)) in which the road type 2129 is "expressway", and outputs the reachable range (Step S2070). Restricting the referencing to only the record(s) in which the road type 2129 is "expressway" is one example; other restrictions are also possible. For example, the referencing may be restricted to only records (rows) having either "expressway" or "main road" as the road type 2129.

Restricting the referencing of the required energy graph to only an "expressway" record (row), or only "expressway" and "main road" records (rows), or referencing the records (rows) for all the roads without restrictions may be selected using a condition decision. In accordance with this, for example, γ1, γ2 (γ1<γ2), which constitute the road link density threshold within a cell, are configured beforehand. When the road link density for a certain cell is less than γ1, the driving range calculation part 113 references the required energy graph related to all road types. When the road link density for a certain cell is equal to or larger than γ1 but less than γ2, the driving range calculation part 113 restricts the referencing of the required energy graph to only records (rows) in which the road type 2129 is either "expressway" or "main road". When the road link density for a certain cell is equal to or larger than γ2, the driving range calculation part 113 restricts the referencing of the required energy graph to only a record(s) (row(s)) in which the road type 2129 is "expressway".

The processing for outputting the reachable range will be explained in detail later using FIG. 11.

Next, the driving range calculation part 113 checks whether or not there has been a change in the position received in Step S2010, and when there has been no change in position, transitions to Step S2080. When there has been a change in position, the driving range calculation part 113 transitions to Step S2020 (Step S2075).

Next, the driving range calculation part 113 references the graph of energy required between road points extracted in Step S2050, outputs reachable range information, and ends the processing for calculating the reachable range (Step S2080). The processing for outputting the reachable range information will be explained in detail later using FIG. 11.

In Step S2020, when the difference between the previously acquired position and the current position received in Step S2010 is equal to or less than the prescribed value α, the driving range calculation part 113, instead of executing the processing of Steps S2030 through S2080, adjusts the previously calculated reachable range in proportion to the amount of movement, outputs this information, and ends the processing for calculating the reachable range (Step S2090). The processing for adjusting the reachable range by the amount of movement and outputting this adjusted reachable range will be explained in details later using FIG. 12.

The reachable range information outputted by the driving range calculation part 113 is transmitted, as a response, from the communication device 130 of the server 10 via the network 50 to the user terminal 20 that transmitted the driving range request. The central processing unit (CPU) 210 mounted in the user terminal 20 that receives the reachable range information executes a program stored in the user terminal 20, and outputs the received reachable range information from the output device 240 to the user who is using the user terminal 20.

As described hereinabove, in this example, the number of processing steps, like Steps S2060, S2070, and S2080, increases more than in Example 1, but a plurality of levels of calculation processing is executed sequentially so that the accuracy of the reachable range steadily rises, and a plurality of reachable ranges are sequentially outputted to the user terminal 20. In this example, instead of executing the processing of Steps S2060, S2070, and S2080 in chronological order, this processing may be executed simultaneously in parallel using distributed processing.

Figure 11:
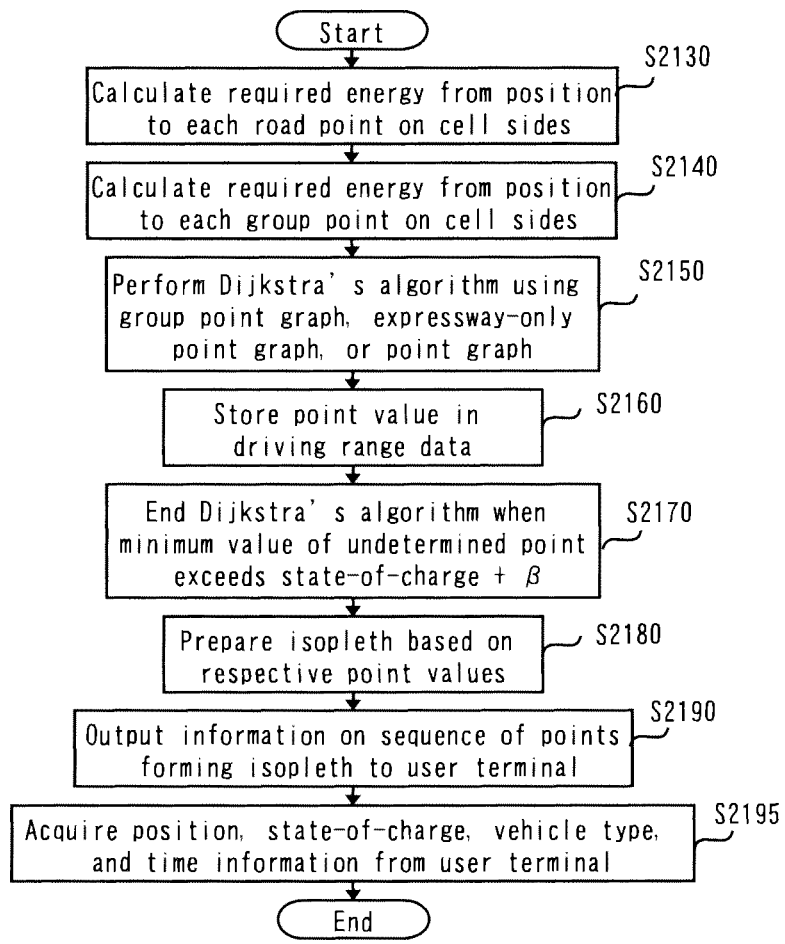
FIG. 11 is a flowchart illustrating in detail the processes by which the driving range calculation part 113 realized by the central processing unit (CPU) 110 mounted in the server 10 creates and outputs an isopleth from a required energy graph in Steps S2060, S2070, or S2080.

FIG. 11 is a flowchart illustrating in detail the processes by which the driving range calculation part 113 realized by the central processing unit (CPU) 110 mounted in the server 10 creates and outputs an isopleth from a required energy graph in Step S2060, S2070, or S2080.

The driving range calculation part 113 of the server 10 causes the route search part 111 to execute processing from the position received in Step S2010 of FIG. 10 to the road point on the side of the cell retrieved in Step S2040 of FIG. 10, and determines the energy required to travel to the road point (Step S2130). This processing may be executing on in Step S2060, and the value determined in Step S2060 may be used in Steps S2070 and S2080.

Next, the driving range calculation part 113 collects together the road points on the sides of the cell retrieved in Step S2040 of FIG. 10 for each side, defines a collection of road points as a group point, and determines the energy required to travel from the position received in Step S2010 of FIG. 10 to each group point (Step S2140).

As the energy required to travel from the position received in Step S2010 of FIG. 10 to each group point, the driving range calculation part 113 may use the average value, the maximum value, or the minimum value of the energy required to travel to the road points included in each group point determined in Step S2130. This processing is executed only in Step S2060, and need not be executed in Steps S2070 and S2080.

Next, the driving range calculation part 113 references a graph that combines the graph extracted in Step S2050 of FIG. 10 with the graph determined in either Step S2130 or S2140, implements Dijkstra's algorithm using the position received in Step S2010 of FIG. 10 as the origin, and configures a cost integration value for each point (Step S2150). For example, when this processing is implemented in Step S2060 of FIG. 10, the driving range calculation part 113 references a graph that combines the graph 122 of the energy required between group points on the sides of a single cell of FIG. 7 with the graph determined in Step S2140, and implements Dijkstra's algorithm using the position received in Step S2010 of FIG. 10 as the origin. When this processing is implemented in Step S2070 of FIG. 10, the driving range calculation part 113 references a graph that combines a graph restricted to only a record(s) (row(s)) having either "expressway" or "main road" as the road type 2129 from the graph 122 of the energy required between road points on the sides of a single cell of FIG. 6 with the graph determined in Step S2130, and implements Dijkstra's algorithm using the position received in Step S2010 of FIG. 10 as the origin. When this processing is implemented in Step S2080 of FIG. 10, the driving range calculation part 113 references a graph that combines the graph 122 of the energy required between road points on the sides of a single cell of FIG. 6 with the graph determined in Step S2130, and implements Dijkstra's algorithm using the position received in Step S2010 of FIG. 10 as the origin.

In addition, the driving range calculation part 113, in the process for implementing Dijkstra's algorithm in Step S2150, stores the cost integration value configured for the points established as the route in the reachable range data 123 (Step S2160).

Next, the driving range calculation part 113 ends the processing of Step S2150 either when cost integration values have been configured for all points, or when the minimum value of the cost integration values configured for points not determined by Dijkstra's algorithm exceeds the sum of the state-of-charge received in Step S2010 of FIG. 10 and a prescribed value β (Step S2170). The prescribed value β is related to the prescribed value α used in Step S2020 of FIG. 10, and the value β is regarded as the energy required to travel the distance of the prescribed value α. When movement inside a cell is equal to or less than the distance of value α, the current reachable range is calculated by adjusting the previous reachable range in proportion to the amount of movement without calculating the cost for each cell, and as such, the cost up to a range that is farther by at least the distance of value α than the range capable of being traveled for the state-of-charge is computed beforehand.

Next, the driving range calculation part 113 uses the cost integration value configured for each point in Step S2150 to prepare an isopleth on the digital map 121 (Step S2180). The isopleth is a curved line that connects points on the map where the states-of-charge received in Step S2010 of FIG. 10 are the same.

In addition, the driving range calculation part 113 outputs one time to the user terminal 20 as reachable range information a sequence of points of latitude and longitude that form the isopleths prepared in Step S2180 (Step S2190). The reachable range information outputted by the driving range calculation part 113 is transmitted from the communication device 130 of the server 10 via the network 50 as a response to the user terminal 20 that transmitted the driving range request.

Finally, the driving range calculation part 113 once again receives from the user terminal 20 specified items from among the current position latitude and longitude, as well as the state-of-charge, the vehicle type, the departure time period, and the vehicle weight, which are arbitrary items, creates an isopleths from the required energy graph, and ends the outputting process (Step S2195). For items not included (not specified) in the driving range request from among the state-of-charge, the vehicle type, the departure time period, and the vehicle weight, the driving range calculation part 113 uses the initial values for the items instead of the value received from the user terminal 20.

Figure 12:
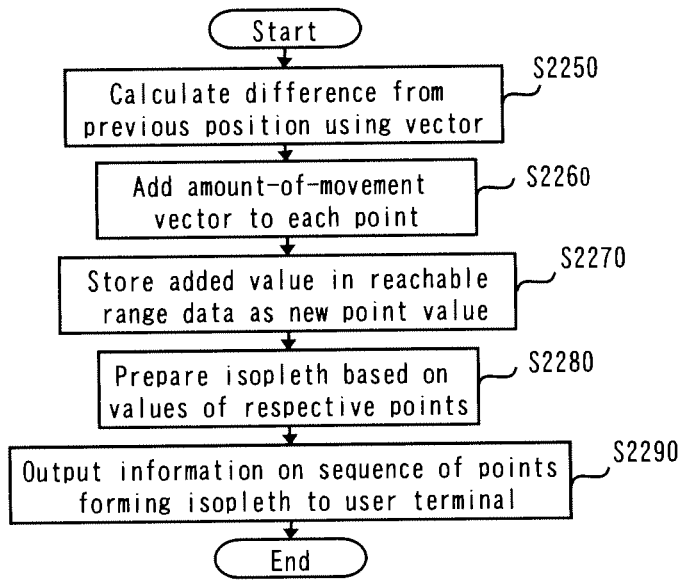
FIG. 12 is a flowchart illustrating in detail the processes by which the driving range calculation part 113 realized by the central processing unit (CPU) 110 mounted in the server 10 adjusts and outputs reachable range data 123 in Step S2090.

FIG. 12 is a flowchart illustrating in detail the processes by which the driving range calculation part 113 realized by the central processing unit (CPU) 110 mounted in the server 10 adjusts and outputs reachable range data 123 in Step S2090. In a case where the movement distance is short when the vehicle moves, this processing is for calculating the current reachable range by adjusting the previously calculated reachable range in proportion to the amount of movement instead of executing the processing of Steps S2030 through S2080 once again. This makes it possible to reduce the processing for calculating the reachable range.

The driving range calculation part 113 of the server 10 first, based on the previous position latitude and longitude and state-of-charge received from the user terminal 20 and the current position latitude and longitude and state-of-charge received from the user terminal 20, calculates a movement vector in which the direction is the difference between the latitudes and longitudes, and the size is the difference between the states-of-charge (Step S2250).

Next, the driving range calculation part 113 reads out the previous reachable range data 123 that was stored in Step S2160 of FIG. 11, and adds the movement vector calculated in Step S2250 to the previous vector from the vehicle location to each point (Step S2260).

Figure 13:
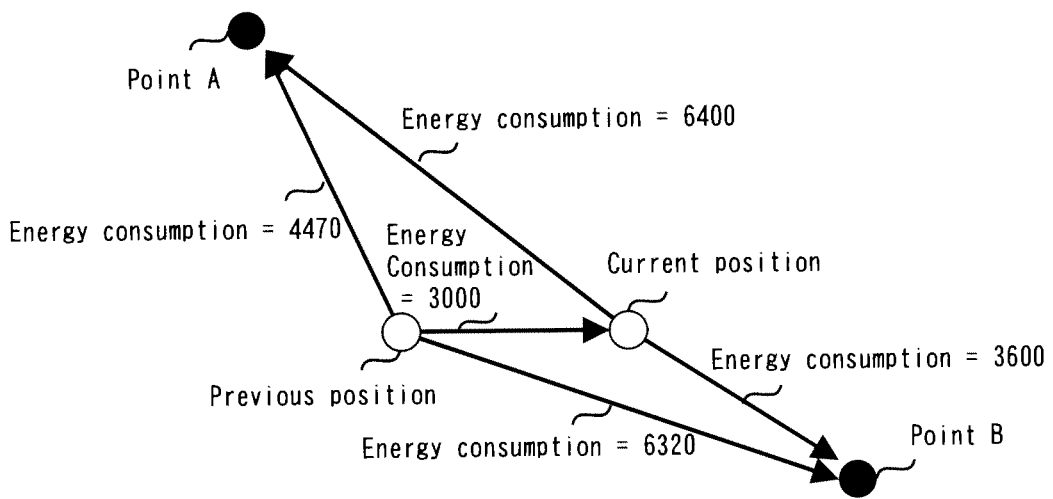
FIG. 13 is a drawing for illustrating an example of a definition of a quantitative change in a point value relative to a change of position.

FIG. 13 is a drawing for illustrating an example of a definition of a quantitative change in a point value relative to a change of position. In FIG. 13, when the vehicle was in the previous position, the cost integrated value of point A (the energy required to travel from the previous position to point A) is 4470 Wh, and the cost integrated value of point B (the energy required to travel from the previous position to point B) is 6320 Wh.

When the current position moves to the east from the previous position, and the energy required for the movement is 3000 Wh, as in FIG. 13, based on the sum of the vectors, the cost integrated value of point A (the energy required to travel from the current position to point A) is 6400 Wh, and the cost integrated value of point B (the energy required to travel from the current position to point B) is 3600 Wh.

The driving range calculation part 113 records the size of the new vector calculated in Step S2260 in the reachable range data 123 as the cost integration values of the points (Step S2270).

Next, the driving range calculation part 113 of the server 10 uses the cost integration value of each point updated in Step S2270 to prepare an isopleth on the digital map 121 (Step S2280). The isopleth is a curved line that connects points on the map where the states-of-charge received from the user terminal 20 are the same.

Next, the driving range calculation part 113 outputs one time to the user terminal 20 a sequence of points of latitude and longitude that form the isopleths prepared in Step S2280 as reachable range information (Step S2290).

The reachable range information outputted by the driving range calculation part 113 is transmitted from the communication device 130 of the server 10 via the network 50 as a response to the user terminal 20 that transmitted the driving range request.

FIG. 12 illustrates processing for calculating the current reachable range by adjusting the previously calculated reachable range in proportion to the amount of vehicle movement instead of executing the processing of Steps S2030 through S2080.

To reduce the processing for calculating the reachable range even further, the entire previously calculated reachable range may be displayed by moving the vehicle in proportion to the amount of movement in place of the processing of FIG. 12.

According to this example, which has been explained hereinabove, it is possible to present the driver with an accurate reachable range using little processing. In this example, it is possible to calculate a more accurate reachable range by manipulating a more detailed spot as the point for the required energy graph rather than a graph that uses a cell as the point as in the first example.

However, because throughput increases in order to calculate a more accurate reachable range, it was decided to calculate the reachable range in stages using a plurality of methods in order from the method with the smallest throughput. By using this example to support driving in such a way that a mobile object such as an electric vehicle does not run out of battery power while traveling, it is possible to provide the driver with a sense of security and to contribute toward accelerating the widespread use of electric vehicles.

Example 3

A third example is one in which a server acquires from a user terminal a position and state-of-charge that have been arbitrarily configured by a user, calculates a reachable range using a required energy graph having as units areas that are coarser than a digital map prepared beforehand, and outputs the reachable range to the user terminal.

The drawing for illustrating the configuration of the reachable range output system in the third example is identical to FIG. 2 illustrating the configuration of the reachable range output system in the first example. However, in this example, the user terminal 20 is a PC or mobile telephone that is not mounted in an electric vehicle, and instead of the position detection device 260 and the state-of-charge detection device 270, it is assumed that the user inputs position information and state-of-charge information via the input device 250. As used here, the current position is the position information inputted by the user.

The storage device 120 of FIG. 2 also stores charging facility information in addition to a digital map 121, a required energy graph 122, and reachable range data 123. The charging facility information is any one or a combination of a plurality of: a charging facility ID for identifying a charging facility; a charging facility name; a latitude-longitude indicating the position of the charging facility; the charging facility address; an ID of the cell that the charging facility falls within; the charging facility hours of operation; a charging system supported by the charging facility (either normal charging or fast charging); and full/vacancy information indicating the current congestion at the charging facility, and this information is stored in the storage device 120 for each charging facility.

In this example, when the required energy graph creation part 112 stores in the cost 2116 of the required energy graph 122 of FIG. 3 the required energy, which has been determined via a route search by the route search part 111, in a case where the required energy changes in accordance with a route search condition, the required energy graph creation part 112 determines the required energy by having a route search performed for each route search condition, prepares a required energy graph 122 for each route search condition, and stores the required energy in the cost 2116 of the corresponding required energy graph 122.

Figure 14:
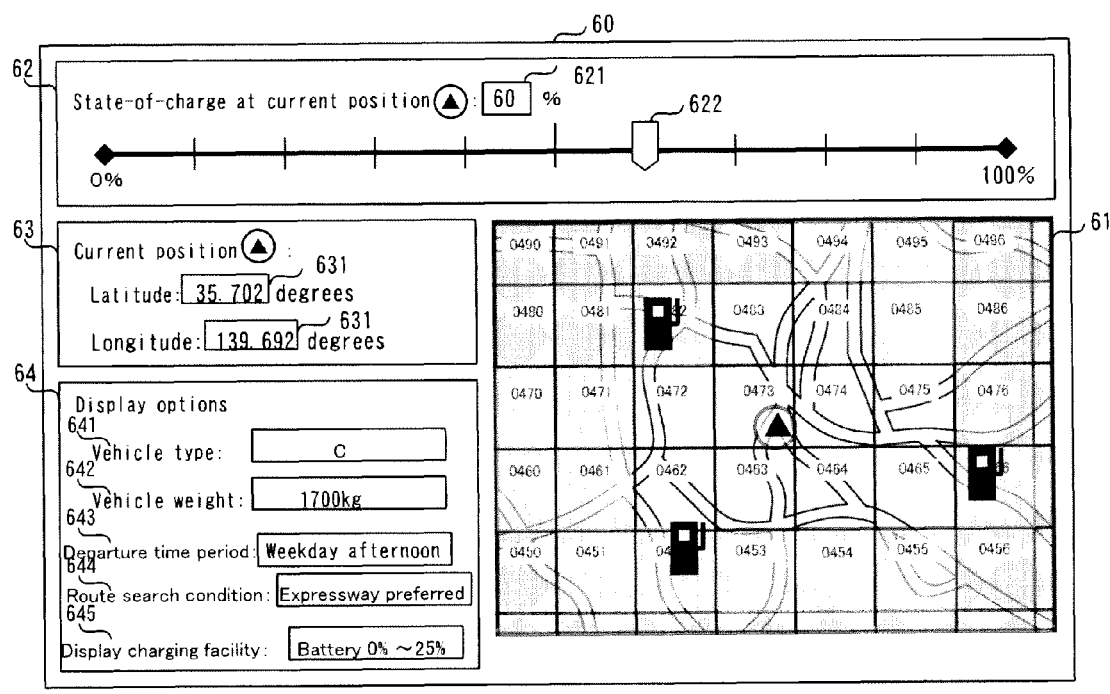
FIG. 14 is a drawing showing an example of a screen 60 for inputting position information and/or state-of-charge information displayed on the output device 240 of the user terminal 20, and displaying a reachable range on a map.

FIG. 14 is a drawing showing an example of a screen 60 for inputting position information and/or state-of-charge information displayed on the output device 240 of the user terminal 20, and displaying a reachable range on a map.

The screen 60 comprises a map display 61 for displaying the reachable range from the current position on a map, a state-of-charge input 62 for inputting the state-of-charge information at the current position, a position information input 63 for inputting the position information of the current position, and display options 64 for configuring parameters for calculating the reachable range and configuring a display condition for the charging facility information.

As the map display 61, a display that is identical to that of FIG. 4B showing the reachable range in cell units is illustrated, but the map display 61 may be displayed using smooth isopleths as in FIG. 4A.

In the state-of-charge input 62, a text box 621 for numerically inputting a state-of-charge percentage at the current position relative to the battery capacity of the electric vehicle, and a slider 622 specifying the same state-of-charge percentage at the current position relative to the battery capacity of the electric vehicle on a scale are displayed. The value inputted using the text box 621 and the slider 622 may be an absolute value of the state-of-charge expressed in Wh.

When the user inputs the state-of-charge using either the text box 621 or the slider 622 of the state-of-charge input 62, the central processing unit (CPU) 210 mounted in the user terminal 20 executes a program stored in the user terminal 20 to transmit the input value to the server 10 as a driving range request. Included in the driving range request is any one or a combination of a plurality of the current position latitude and longitude, the state-of-charge, the vehicle type, the departure time period, and the vehicle weight that has been either configured beforehand or inputted by the user.

In response to the above-mentioned driving range request, the driving range calculation part 113 of the server 10 calculates a reachable range by performing processing identical to that of either FIG. 5 or FIG. 10, and the central processing unit (CPU) 210 of the user terminal 20 that receives this reachable range executes a program stored in the user terminal 20 to display the above-mentioned reachable range on the map display 61 of the screen 60.

A text box 631 for numerically inputting the current position latitude-longitude is disposed in the position information input 63. The values inputted using the text box 631 may be an address indicating a point on the map. The current position may be specified by pointing to an arbitrary point on the map being displayed in the map display 61, or the current position may be moved to an arbitrary location by dragging the triangle indicating the current position displayed in the center of the map display 61.

When the user inputs the position information using the text box 631 of the position information input 63 and/or the map display 61, the central processing unit (CPU) 210 mounted in the user terminal 20 executes a program stored in the user terminal 20 to transmit the input value to the server 10 as a driving range request. Included in the driving range request is any one or a combination of a plurality of the current position latitude and longitude, the state-of-charge, the vehicle type, the departure time period, and the vehicle weight that has been either configured beforehand or inputted by the user.

In response to the above-mentioned driving range request, the driving range calculation part 113 of the server 10 calculates a reachable range by performing processing identical to that of either FIG. 5 or FIG. 10, and the central processing unit (CPU) 210 of the user terminal 20 that receives this reachable range executes a program stored in the user terminal 20 to display the above-mentioned reachable range in the map display 61 of the screen 60.

In the display options 64, there is disposed any one or a combination of a plurality of a vehicle type pull-down menu 641 for selecting from a list and inputting a vehicle type indicating the type of vehicle, a vehicle weight pull-down menu 642 for selecting from a list and inputting a vehicle weight, a departure time period pull-down menu 643 for selecting from a list and inputting a departure time period, a route search condition pull-down menu 644 for selecting from a list and inputting a driving method (route search condition) that the driver uses on a preferential basis when traveling, and a charging facility display pull-down menu 645 for selecting from a list and inputting a display condition for displaying a charging facility on the map display 61.

Instead of a pull-down menu, the input method for this information may be a text box for inputting characters directly. When the user inputs a display option using the vehicle type pull-down menu 641, the vehicle weight pull-down menu 642, the departure time period pull-down menu 643, or the route search condition pull-down menu 644 of the display options 64, the central processing unit (CPU) 210 mounted in the user terminal 20 executes a program stored in the user terminal 20 to transmit the input value to the server 10 as a driving range request. Included in the driving range request is any one or a combination of a plurality of the current position latitude and longitude, the state-of-charge, the vehicle type, the departure time period, the vehicle weight, and the route search condition that has been either configured beforehand or inputted by the user.

In response to the above-mentioned driving range request, the driving range calculation part 113 of the server 10 calculates a reachable range by performing processing identical to that of either FIG. 5 or FIG. 10 and transmits this reachable range to the user terminal 20, and the central processing unit (CPU) 210 of the user terminal 20 that receives this reachable range executes a program stored in the user terminal 20 to display the above-mentioned reachable range in the map display 61 of the screen 60. When performing the processing that is identical to that of either FIG. 5 or FIG. 10, the driving range calculation part 113 of the server 10 references the required energy graph 122 corresponding to the vehicle type, the departure time period, and the route search condition and so forth included in the above-mentioned driving range request.

The charging facility display pull-down menu 645 is for specifying a display condition for displaying a charging facility on the map display 61, and examples of display conditions capable of being displayed are "battery 0%-25%", "battery 0%-50%", "battery 0%-75%", "battery 0%-100%", "battery 25%-50%", "battery 50%-75%", and "battery 75%-100%".

When the driver wants to display all of the charging facilities that fall within the reachable range, the driver selects "battery 0%-100%". When the driver wants to display the charging facility(ies) that fall between the range reachable with the state-of-charge at the current position and the range reachable with 75% of the state-of-charge at the current position, the driver selects "battery 0%-25%". The map display 61 of FIG. 14 is an example of the display when "battery 0%-25%" has been selected. Generally speaking, charging facility position information is considered to be more important when the state-of-charge is lower rather than higher. According to this function, it is possible to restrict the display to charging facilities that exist in the vicinity where the state-of-charge runs out.

An isopleth indicating the range reachable with the state-of-charge at the current position, and an isopleth indicating the range reachable with 75% of the state-of-charge at the current position are depicted in the map display 61 of FIG. 14, and the charging facilities that exist therebetween are displayed. When the user inputs a display option using the charging facility display pull-down menu 645 of the display options 64, the central processing unit (CPU) 210 mounted in the user terminal 20 executes a program stored in the user terminal 20 to transmit the input value to the server 10 as a driving range request. Included in the driving range request is any one or a combination of a plurality of the current position latitude and longitude, the state-of-charge, the vehicle type, the departure time period, the vehicle weight, the route search condition, and the charging facility display condition that has been either configured beforehand or inputted by the user.

In response to the above-mentioned driving range request, the driving range calculation part 113 of the server 10 calculates a reachable range by performing processing identical to that of either FIG. 5 or FIG. 10, and the central processing unit (CPU) 210 of the user terminal 20 that receives this reachable range executes a program stored in the user terminal 20 to display the above-mentioned reachable range in the map display 61 of the screen 60. After using the cost integration value configured for each cell to prepare an isopleth on the digital map 121, the driving range calculation part 113 of the server 10 extracts from the charging facility information stored in the storage device 120 a charging facility that corresponds to the charging facility display condition, and includes this information in the reachable range and transmits the reachable range to the user terminal 20. The facility displayed using the charging facility display condition is not limited to a charging facility, and may also be a facility such as a parking lot, a restaurant, or a shopping store.

According to this example, which has been explained hereinabove, it is possible to present the driver with an accurate reachable range using little processing. In this example, as a method for inputting a parameter for displaying the reachable range, it is possible to present the user with an intuitive input method that uses a slider and a map in addition to a numerical input, and to display the reachable range in conjunction with these inputs. It is also possible to display a charging facility that corresponds to the reachable range.

The embodiment and respective examples explained hereinabove may be put into practice in a combined manner.

The embodiment and examples of the present invention described hereinabove are illustrations for explaining the present invention, and do not purport to limit the scope of the present invention solely to the embodiment and examples. A person having ordinary skill in the art will be able to put the present invention into practice in various other modes without departing from the gist of the present invention.

REFERENCE SIGNS LIST

1 Driving range calculation apparatus
10 Server
110 Central processing unit
111 Route search part
112 Required energy graph creation part
113 Driving range calculation part
120 Storage device
121 Digital map
122 Required energy graph
123 Reachable range data
130 Communications device
2 Required energy calculation part
20 User terminal
230 Communication device
240 Output device
250 Input device
260 Location detection device
270 State-of-charge detection device
3 Integration part
4 Range determination part
5 Storage part
50 Network
6 Display part

The invention claimed is:

1. A reachable range calculation apparatus for computing a range that a vehicle traveling on stored energy is able to reach, comprising:
a storage part stores beforehand information on a required amount of energy consumed when the vehicle moves, by using each of a plurality of areas into which a map has been divided as a unit;
an integration part integrates, with respect to movement of the vehicle from a specified origin to a surrounding area, a required amount of energy on the basis of the required amount of energy stored in the storage part, by adding a required amount of energy of an area each time the vehicle moves between areas; and
a range determination part determines, on the basis of an amount of remaining energy in a battery mounted in the vehicle and an integrated required amount of energy obtained by the integration part integrating energy-consumption amounts, a reachable range, which is a range of areas that the vehicle is able to reach using the amount of remaining energy.

2. A reachable range calculation apparatus according to claim 1, wherein the storage part stores information on the required amount of energy for a plurality of layers in which the areas obtained by dividing the map are of different sizes, and
the integration part selects a layer in accordance with the amount of remaining energy, and integrates the required amounts of energy for the selected layer.

3. A reachable range calculation apparatus according to claim 1, wherein, when determining a reachable range using an origin that falls within a prescribed distance range from the origin when a previous reachable range has been determined,
the integration part does not integrate the required amounts of energy, and
the range determination part determines a current reachable range by adjusting the previous reachable range in proportion to the change of origin and in proportion to the change in amount of remaining energy.

4. A reachable range calculation apparatus according to claim 1, further comprising a required energy calculation part records in the storage part an amount of energy consumed after the vehicle enters the area until the vehicle exits the area as a required amount of energy in area units,
wherein, with respect to the movement of the vehicle from the origin to the surrounding area, the integration part adds a required amount of energy for a first area to the integrated required amount of energy each time the vehicle moves from the first area to an adjacent second area.

5. A reachable range calculation apparatus according to claim 4, wherein the required energy calculation part calculates an amount of energy consumed after the vehicle enters the area until the vehicle exits the area for a road over which the vehicle passes, and records the energy-consumption amount in the storage part as a required amount of energy in area units.

6. A reachable range calculation apparatus according to claim 4, wherein the area is a polygon having a plurality of sides, and
the required energy calculation part calculates, on the basis of the energy-consumption amount for each road that enters the area from a first side and exits the area from a second side, a required amount of energy for each combination of the first side and the second side, and records the required amount of energy in the storage part as a required amount of energy in area units.

7. A reachable range calculation apparatus according to claim 4, wherein the required energy calculation part calculates an energy-consumption amount after the vehicle enters the area until the vehicle exits the area for a road extracted using a prescribed condition, and records the energy-consumption amount in the storage part as a required amount of energy in area units.

8. A reachable range calculation apparatus according to claim 4, further comprising a display part displays the reachable range,
wherein processing methods having short processing times are executed in sequence from among a plurality of types of processing methods when the required energy calculation part records in the storage part a required amount of energy consumed after the vehicle enters the area until the vehicle exits the area, the integration part integrates, with respect to the movement of the vehicle from the origin to the surrounding area, required amounts of energy on the basis of the required amount of energy when the vehicle moves between areas, the range determination part determines a reachable range, and the display part displays the reachable range.

9. A reachable range calculation apparatus according to claim 1, further comprising a display part displays the reachable range,
wherein the display part displays the reachable range on a map that includes all the areas of the reachable range, using the contour of the areas as a boundary.

10. A reachable range calculation apparatus according to claim 1, further comprising a display part for displaying the reachable range,
wherein the display part represents the reachable range using a smooth boundary depicted on a map so as to include at least a portion of the areas of the reachable range.

11. A reachable range calculation apparatus according to claim 1, further comprising a display part for displaying the reachable range,
wherein processing, in which the integration part integrates, with respect to the movement of the vehicle from the origin to the surrounding area, required amounts of energy on the basis of the required amount of energy when the vehicle moves between areas and the range determination part determines a reachable range, is performed for a plurality of types of route search conditions, and the display part displays the reachable range for a specified route search condition.

12. A reachable range calculation apparatus according to claim 1, further comprising:
a route search part performs a route search from the origin to a specified destination and determining a route; and
a display part displays the reachable range and the route, and also displays a warning when the route extends outside of the reachable range.

13. A reachable range estimation method for computing a range that a vehicle traveling on stored energy is able to reach, the driving range calculation method comprising the steps of:
storing beforehand information on a required amount of energy consumed when the vehicle moves, using each of a plurality of areas into which a map has been divided as a unit;
integrating, with respect to movement of the vehicle from a specified origin to a surrounding area, a required amount of energy on the basis of the recorded required amount of energy, by adding a required amount of energy of an area each time the vehicle moves between areas; and
determining, on the basis of an amount of remaining energy in a battery mounted in the vehicle and an integrated required amount of energy obtained by integrating required amounts of energy, a reachable range, which is a range of areas that the vehicle is able to reach using the amount of remaining energy.

14. A driving range calculation method according to claim 13, further comprising the step of:
recording beforehand an amount of energy consumed after the vehicle enters the area until the vehicle exits the area as a required amount of energy in area units,
wherein, with respect to the movement of the vehicle from the origin to the surrounding area, a required amount of energy for a first area is added to the integrated required amount of energy each time the vehicle moves from the first area to an adjacent second area.

15. A driving range calculation method according to claim 13, further comprising the step of:
displaying the reachable range on a map that includes all the areas of the reachable range, using the contour of the areas as a boundary.

16. A reachable area display method for displaying an area that a vehicle traveling on stored energy is able to reach, the reachable area display method comprising the processes of:
acquiring information on an origin of the vehicle;
using each of a plurality of areas into which a map has been divided as a unit, using a required amount of energy necessary for the vehicle to move from a certain area to an adjacent area, and on the basis of the acquired origin information, determining for each area an integrated required amount of energy necessary for the vehicle to move from the origin by adding a required amount of energy of an area each time the vehicle moves between areas, and calculating a state-of-charge of the vehicle in the area; and
displaying, on a map, a reachability based on the state-of-charge of the vehicle in each of the areas on the basis of the calculation result.

17. A reachable area display method according to claim 16, further comprising the process of acquiring a parameter that affects the required amount of energy,
wherein the state-of-charge of the vehicle is calculated by taking the acquired parameter into account.

18. A reachable area display method according to claim 17, wherein a route search condition is acquired as one parameter that affects the required amount of energy, and
the state-of-charge of the vehicle is calculated by taking the acquired route search condition into account.

19. A reachable area display method according to claim 16, wherein one or more states-of-charge are specified, and facility information on a charging facility that exists in an area in which the state-of-charge of the vehicle is the specified state-of-charge, and in an area in the vicinity of that area.

* * * * *